US008890992B2

(12) United States Patent  
Osaka et al.

(10) Patent No.: US 8,890,992 B2  
(45) Date of Patent: Nov. 18, 2014

(54) MOBILE ELECTRONIC DEVICE

(75) Inventors: Masashi Osaka, Yokohama (JP); Yasuhiro Ueno, Yokohama (JP); Yasushi Kitamura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 420 days.

(21) Appl. No.: 13/203,082

(22) PCT Filed: Feb. 25, 2010

(86) PCT No.: PCT/JP2010/053005  
§ 371 (c)(1),  
(2), (4) Date: Aug. 24, 2011

(87) PCT Pub. No.: WO2010/098406  
PCT Pub. Date: Sep. 2, 2010

(65) Prior Publication Data  
US 2012/0057061 A1    Mar. 8, 2012

(30) Foreign Application Priority Data

Feb. 25, 2009 (JP) ................................ 2009-043197  
Apr. 24, 2009 (JP) ................................ 2009-106548

(51) Int. Cl.  
H04N 5/222    (2006.01)  
H04N 5/64     (2006.01)  
H04N 9/31     (2006.01)  
H04M 1/02     (2006.01)  
G03B 17/54    (2006.01)

(52) U.S. Cl.  
CPC .............. *H04N 9/31* (2013.01); *H04N 9/3194* (2013.01); *H04M 1/0272* (2013.01); *G03B 17/54* (2013.01); *H04N 9/3173* (2013.01)  
USPC ....................................... 348/333.1; 348/744

(58) Field of Classification Search  
CPC ............. H04N 9/3176; H04N 5/23293; G06F 1/1626; G06F 1/163; G06F 1/1673  
USPC ............................................... 348/333.1, 744  
See application file for complete search history.

(56) References Cited

U.S. PATENT DOCUMENTS

2006/0007005 A1* 1/2006 Yui et al. ..................... 340/573.4  
2008/0281787 A1* 11/2008 Arponen et al. ................. 707/3

FOREIGN PATENT DOCUMENTS

JP    8-079102 A     3/1996  
JP    11-225346 A    8/1999

(Continued)

OTHER PUBLICATIONS

Tamura Yoichi, Projector and obstacle detecting method, Apr. 7, 2005, JP 2005-091665 ( machine translation).*  
Yamada Seiji, Portable Electronic Equipment, Jan. 8, 2009, Ricoh, JP 2009-003281 (machine translation).*

(Continued)

*Primary Examiner* — Twyler Haskins  
*Assistant Examiner* — Quang Le  
(74) *Attorney, Agent, or Firm* — Lowe Hauptman & Ham, LLP

(57) ABSTRACT

A mobile electronic device 10 includes a projector 34, a camera 36, and a processing unit 22. The projector 34 projects an image, and the camera 36 captures the image projected by the projector 34. Based on first image information for causing the projector 34 to project a predetermined image and second image information obtained by capturing the image projected by the projector 34 based on the first image information by the camera 36, the processing unit 22 determines whether the projector 34 projects the predetermined image. When determining that the projector 34 fails to project the predetermined image, the processing unit 22 suppresses output of the projector 34 for projecting the image.

11 Claims, 16 Drawing Sheets

(56) References Cited

FOREIGN PATENT DOCUMENTS

| JP | 2002-007027 A | | 1/2002 |
|---|---|---|---|
| JP | 2005-091665 A | | 4/2005 |
| JP | 2005-091665 | * | 7/2005 |
| JP | 2006074095 A | | 3/2006 |
| JP | 2006146046 A | | 6/2006 |
| JP | 2007-096542 A | | 4/2007 |
| JP | 2008293276 A | | 12/2008 |
| JP | 2009-003281 A | | 1/2009 |

OTHER PUBLICATIONS

Haruyama, Electronic appliance, Mar. 22, 1996, JP 08-079102 (machine translation).*

Hosoya Naoki, Method and system for checking display monitor image, Aug. 17, 1999, JP 11-225346 (machined translation).*

International Search Report for PCT/JP2010/053005 mailed Apr. 6, 2010.

Japanese Office Action mailed Feb. 26, 2013 for Application No. 2009-106548.

* cited by examiner

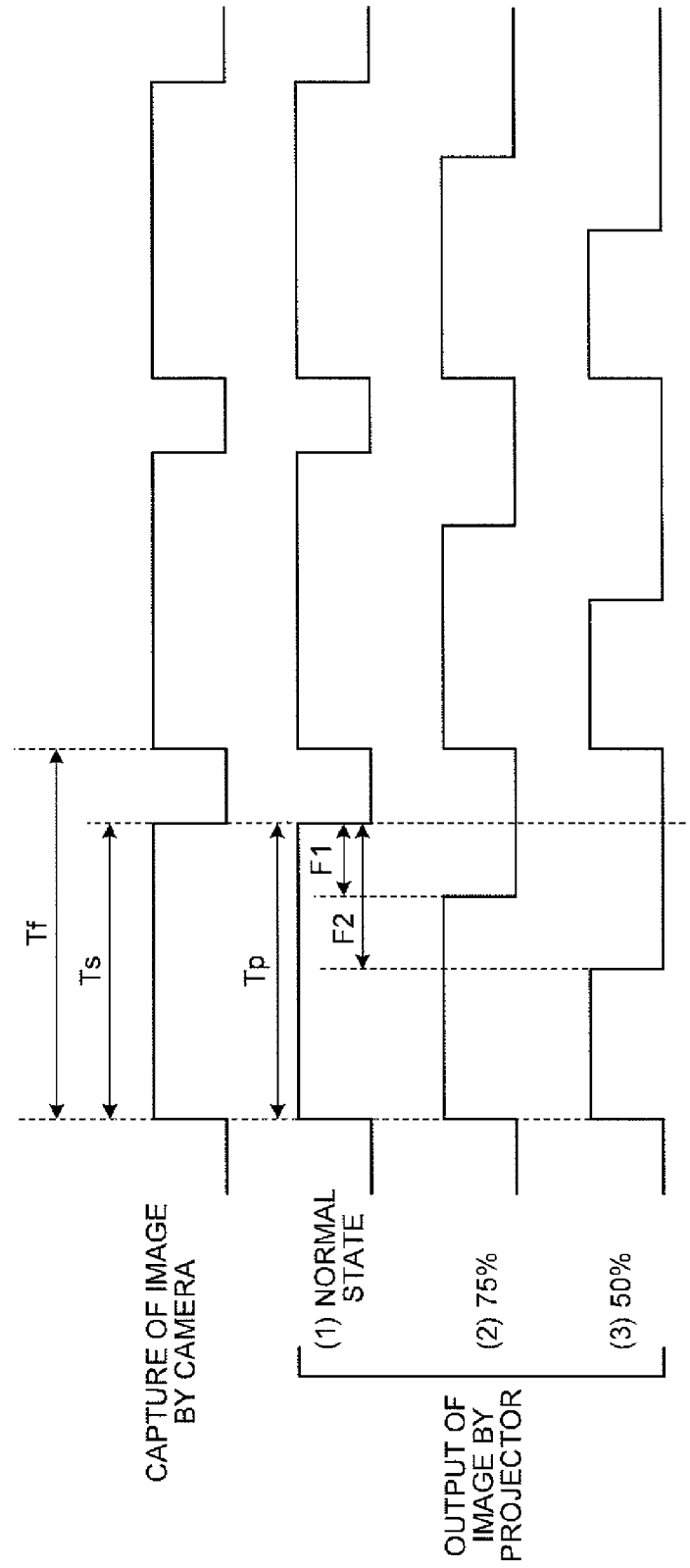

MOBILE ELECTRONIC DEVICE

CROSS-REFERENCE TO RELATED APPLICATION

This application is a National Stage of International Application No. PCT/JP2010/053005 filed on Feb. 25, 2010 which designates the United States and which is based upon and claims the benefit of priority from Japanese Patent Application No. 2009-43197, filed on Feb. 25, 2009, and Japanese Patent Application No. 2009-106548, filed on Apr. 24, 2009.

TECHNICAL FIELD

The present invention relates to a mobile electronic device having an image projecting unit that projects an image on a screen or a wall surface.

BACKGROUND ART

Conventional devices that project an image on a wall surface or a screen include so-called projectors. A mainstream of such projectors is a so-called stationary-type device that is supplied with electric power from a commercial power supply and used in a state fixed to a predetermined position. Such a stationary-type projector in its fixed state projects an image on a certain portion of a wall surface or a screen.

By contrast, in recent years, a mobile projector that is small in size and easy to carry around has been developed as a projector. For example, Patent Literature 1 discloses a mobile terminal having a projector function provided with an upper housing, a lower housing, and a hinge portion for connecting the upper housing and the lower housing in a mutually rotatable manner, and on which a projector including a lens and a light source is mounted.

CITATION LIST

Patent Literature

Patent Literature 1: Japanese Patent Application Laid-open No. 2007-096542

DISCLOSURE OF INVENTION

Problem to be Solved by the Invention

There may be a case where the projector fails to project a predetermined image to be projected. Even in such a case, however, the operations of the projector continue. In view of the above, it is an object of the present invention to make a mobile electronic device including an image projecting unit that projects an image suppress projection of an image when the image projecting unit fails to project a predetermined image.

SUMMARY OF THE INVENTION

In order to solve the above-described problem and achieve the above object, according to the present invention, a mobile electronic device includes: an image projecting unit that projects an image; and a processing unit that performs projection processing for causing the image projecting unit to project a predetermined image based on predetermined image information. The processing unit suppresses projection performed by the image projecting unit when determining that the predetermined image is not projected while the projection processing based on the predetermined image information is performed.

According to a preferable of the present invention, the mobile electronic device further includes an imaging unit that captures the image projected by the image projecting unit. The processing unit determines whether the predetermined image is projected from first image information that is the predetermined image information for causing the image projecting unit to project the predetermined image and second image information obtained by capturing the predetermined image projected by the image projecting unit by the imaging unit.

According to a preferable of the present invention, the processing unit makes time during which the image projecting unit projects the predetermined image based on the first image information identical to exposure time during which the imaging unit captures the image projected by the image projecting unit based on the first image information.

According to a preferable of the present invention, the processing unit causes the imaging unit to start in response to start of the image projecting unit.

According to a preferable of the present invention, the first image information is test image information for determining whether the predetermined image is projected by the image projecting unit. The processing unit causes the image projecting unit to project the test image information, and causes the imaging unit to capture an image projected based on the test image information.

According to a preferable of the present invention, the image projecting unit projects a visible image and an invisible image. The imaging unit captures a predetermined invisible image projected by the image projecting unit as the predetermined image. The processing unit suppresses projection of the visible image performed by the image projecting unit when determining that the predetermined invisible image is not projected from third image information for causing the image projecting unit to project the predetermined invisible image and fourth image information obtained by capturing the invisible image projected by the image projecting unit based on the third image information by the imaging unit.

According to a preferable of the present invention, the processing unit makes time during which the image projecting unit projects the predetermined invisible image based on the third image information identical to exposure time during which the imaging unit captures the predetermined invisible image projected by the image projecting unit based on the third image information.

According to a preferable of the present invention, the visible image and the invisible image projected by the image projecting unit are projected in a superimposed manner.

According to a preferable of the present invention, the processing unit causes the image projecting unit to project the invisible image before the image projecting unit projects the visible image.

According to a preferable of the present invention, the processing unit causes the image projecting unit to project the visible image when it is determined that the predetermined invisible image is projected.

According to a preferable of the present invention, the processing unit causes a notification unit included in the mobile electronic device to perform notification indicating that the predetermined image is not projected when it is determined that the predetermined image is not projected.

According to a preferable of the present invention, the processing unit causes a storage unit included in the mobile electronic device to store therein information indicating that the predetermined image is not projected when it is determined that the predetermined image is not projected.

According to a preferable of the present invention, the mobile electronic device further includes a photo detecting unit that detects reflected light of the image projected by the image projecting unit based on the predetermined image information. The processing unit determines whether the predetermined image is projected based on the reflected light detected by the photo detecting unit.

According to a preferable of the present invention, the mobile electronic device further includes a detection unit that detects a fact that a housing of the mobile electronic device is opened. The processing unit suppresses the projection performed by the image projecting unit when the detection unit detects the fact that the housing is opened.

According to a preferable of the present invention, the detection unit is driven by a power source different from a power source that drives the image projecting unit.

According to a preferable of the present invention, the detection unit is a light detection sensor.

According to a preferable of the present invention, the processing unit causes a notification unit included in the mobile electronic device to notify information indicating that the housing is opened when the detection unit detects the fact that the housing is opened.

According to a preferable of the present invention, the processing unit causes a storage unit included in the mobile electronic device to store therein information indicating that the housing is opened when the detection unit detects the fact that the housing is opened.

Effect of the Invention

According to the present invention, it is possible to make a mobile electronic device including an image projecting unit that projects an image suppress projection of an image when the image projecting unit fails to project a predetermined image.

BRIEF DESCRIPTION OF DRAWINGS

FIG. 6 is a timing chart when it is determined whether the predetermined image is projected by the projector in the mobile electronic device according to the first embodiment.

DESCRIPTION OF EMBODIMENTS

The present invention will be described below in detail with reference to the drawings. It is to be noted that the present invention is not limited by the following explanation. Besides, the components explained in the following include those that can be easily thought of by persons skilled in the art, and substantially equivalents or those in an equivalent scope. A mobile phone will be explained hereinafter as an example of a mobile electronic device, however, an applied target of the present invention is not limited to the mobile phone, and the present invention can also be applied to, for example, a Personal Handyphone System (PHS), a PDA, a portable navigation device, a notebook computer, and a game machine.

First Embodiment

Figure 1:
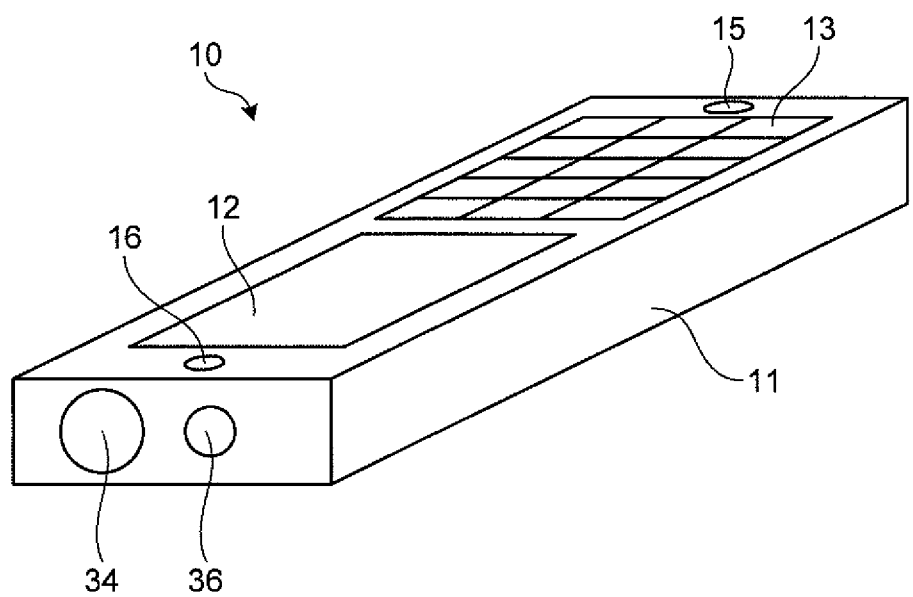
FIG. 1 is a perspective view of a schematic structure of an embodiment of a mobile electronic device according to a first embodiment.

FIG. 1 is a perspective view of a schematic structure of an embodiment of a mobile electronic device according to a first embodiment. First, an external configuration of the mobile electronic device will be described. A mobile electronic device 10 is a mobile phone with a wireless communication function. The mobile electronic device 10 is a straight mobile phone that has a box-shaped housing 11, and stores each component therein. In the present embodiment, the housing 11 is formed in a box shape. However, the housing 11 may be a foldable housing formed with two members coupled to each other by a hinge, or a housing formed with two members that are slidable, for example. A housing connected with three or more members can also be used.

As illustrated in FIG. 1, the housing 11 is provided with a display 12 as a display unit. The display 12 displays a standby image while the mobile electronic device 10 is waiting for reception, and displays a menu image used for assisting the operations of the mobile electronic device 10.

The housing 11 is provided with a plurality of operation keys 13 used for inputting a telephone number of an intended party, and characters when an email is created. The operation keys 13 constitute an operating unit of the mobile electronic device 10. The housing 11 is also provided with a microphone 15 that receives voice during a call on the mobile electronic device 10, and a receiver 16 that outputs voice during a call on the mobile electronic device 10. An image projecting surface of a projector 34 serving as an image projecting unit, and a light receiving surface of a camera 36 serving as an imaging unit are exposed on a side surface of the housing 11, the surface on the receiver 16 side. Therefore, in the present embodiment, a direction perpendicular to the image projecting surface of the projector 34, and a direction perpendicular to the light receiving surface of the camera 36 are configured to be approximately in parallel, thereby allowing the camera 36 to capture an image projected by the projector 34.

Figure 2:
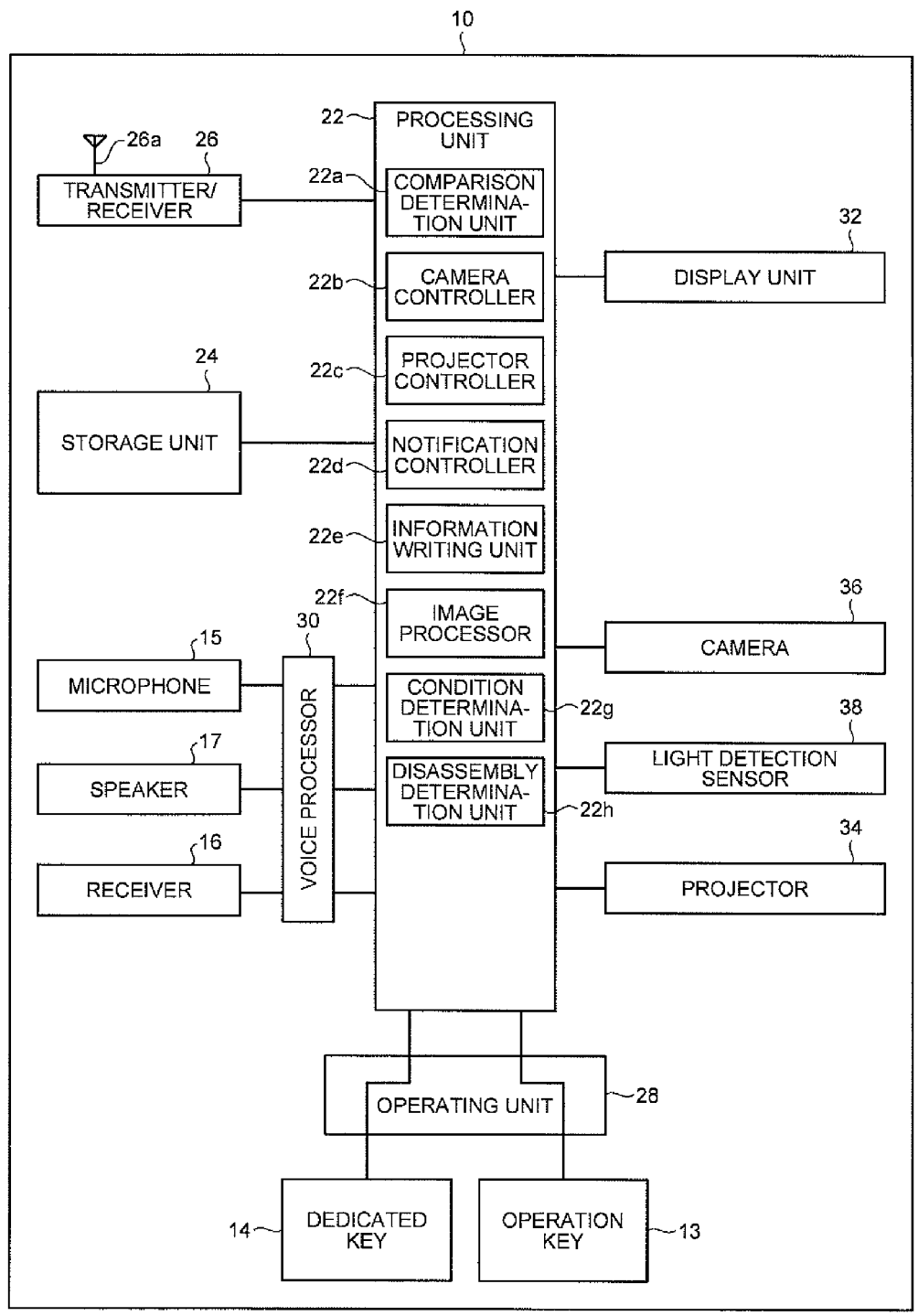
FIG. 2 is a block diagram of a schematic configuration of functions of the mobile electronic device illustrated in FIG. 1.

FIG. 2 is a block diagram of a schematic configuration of functions of the mobile electronic device illustrated in FIG. 1. As illustrated in FIG. 2, the mobile electronic device 10 includes a processing unit 22, a storage unit 24, a transmitter/receiver 26, an operating unit 28, a voice processor 30, a display unit 32, the projector 34, the camera 36, and a light detection sensor 38. The processing unit 22 has a function to control the entire operations of the mobile electronic device 10 integrally. In other words, the processing unit 22 controls the operations of the transmitter/receiver 26, the voice processor 30, the display unit 32, and the like such that various types of processing of the mobile electronic device 10 are performed by an appropriate process in accordance with the operation of the operating unit 28, and software stored in the storage unit 24 of the mobile electronic device 10. The various types of processing of the mobile electronic device 10 include, for example, voice communications performed through a line switching network, creation and transmission/reception of an email, and browsing of a World Wide Web (Web) site on the Internet. In addition, the operations of the transmitter/receiver 26, the voice processor 30, the display unit 32, and the like include, for example, transmission/reception of a signal performed by the transmitter/receiver 26, input/output of voice performed by the voice processor 30, and display of an image performed by the display unit 32. The processing unit 22 performs projection processing. The projection processing is processing in which the processing unit 22 causes the projector 34 to project a predetermined image based on predetermined image information.

The processing unit 22 performs processing based on a computer program (e.g., an operating system program and an application program) stored in the storage unit 24. The processing unit 22 is formed with a Micro Processing Unit (MPU), for example, and performs the various types of processing of the mobile electronic device 10 in accordance with the process instructed by the software. In other words, the processing unit 22 reads operation codes from the operating system program, the application program, and the like stored in the storage unit 24 sequentially to perform the processing.

The processing unit 22 has a function to execute a plurality of application programs. The application programs executed by the processing unit 22 include, for example, a plurality of application programs such as an application program for controlling the drive of the projector 34 and the camera 36, an application program for reading various types of image files (image information) from the storage unit 24 and decoding the image files, and an application program for causing the image obtained by being decoded to be displayed by the display unit 32 or to be projected by the projector 34.

In the present embodiment, the processing unit 22 includes a comparison determination unit 22a, a camera controller 22b, a projector controller 22c, a notification controller 22d, an information writing unit 22e, an image processor 22f, a condition determination unit 22g, and a disassembly determination unit 22h. The functions of the comparison determination unit 22a, the camera controller 22b, the projector controller 22c, the notification controller 22d, the information writing unit 22e, the image processor 22f, the condition determination unit 22g, and the disassembly determination unit 22h are realized by hardware resources formed with the processing unit 22 and the storage unit 24 performing tasks allocated by the controllers of the processing unit 22. The task used herein means a unit of processing that cannot be performed simultaneously among the whole processing performed by the application software, or among the processing performed by the same application software.

The storage unit 24 stores therein software and data used for the processing in the processing unit 22. The storage unit 24 further stores therein a task for activating the application program described above for controlling the drive of the projector 34 and the camera 36, and a task for activating an image processing program. In addition to these tasks, the storage unit 24 stores therein, for example, communicated and downloaded speech data, software used by the processing unit 22 for controlling the storage unit 24, an address book in which phone numbers, mail addresses, and the like of communication opposite parties are described to be managed, an audio file such as a dial tone and a ring tone, and temporary data used in a processing process of software. The computer program and the temporary data used in the processing process of the software are stored in a work area allocated to the storage unit 24 by the processing unit 22 temporarily. The storage unit 24 is formed with, for example, a nonvolatile storage device (a nonvolatile semiconductor memory such as a Read Only Memory (ROM), and a hard disk drive), and a readable/writable storage device (e.g., a Static Random Access Memory (SRAM), and a Dynamic Random Access Memory (DRAM)).

The transmitter/receiver 26 includes an antenna 26a, establishes a wireless signal line by a Code Division Multiple Access (CDMA) system or the like with a base station through a channel allocated by the base station, and performs telephone communications and information communications with the base station. The operating unit 28 is formed with, for example, the operation keys 13 to which various types of functions are allocated respectively, such as a power key, a talk key, numeric keys, character keys, direction keys, an OK key, and a send key, and with a dedicated key 14 to which especial operations are allocated. When these keys are input through an operation by a user, a signal corresponding to the content of the operation is generated. The generated signal is received by the processing unit 22 as an instruction of the user.

The voice processor 30 performs processing of a voice signal received by the microphone 15, and a voice signal output from the receiver 16 or a speaker 17. In other words, the voice processor 30 amplifies the voice supplied from the microphone 15, and performs Analog to Digital conversion (AD conversion) on the voice. The voice processor 30 then performs signal processing such as encoding on the voice, converts the voice into digital voice data, and outputs the digital voice data to the processing unit 22. Furthermore, the voice processor 30 decodes the voice data sent from the processing unit 22, performs processing such as Digital to Analog conversion (DA conversion) and amplification on the voice data to convert the voice data into an analog voice signal, and outputs the analog voice signal to the receiver 16 or the speaker 17. The speaker 17 is arranged in the housing 11 of the mobile electronic device 10, and outputs a ring tone, a sending tone of a mail, and the like.

The display unit 32 includes the display 12, and displays a video image in accordance with video data and an image in accordance with image data supplied from the processing unit 22 on a display panel. The display 12 is formed with the display panel of, for example, a Liquid Crystal Display (LCD or Liquid Crystal monitor), an Organic Electro-Luminescence (EL) panel or the like. The display unit 32 may include a sub-display in addition to the display 12.

Figure 3:
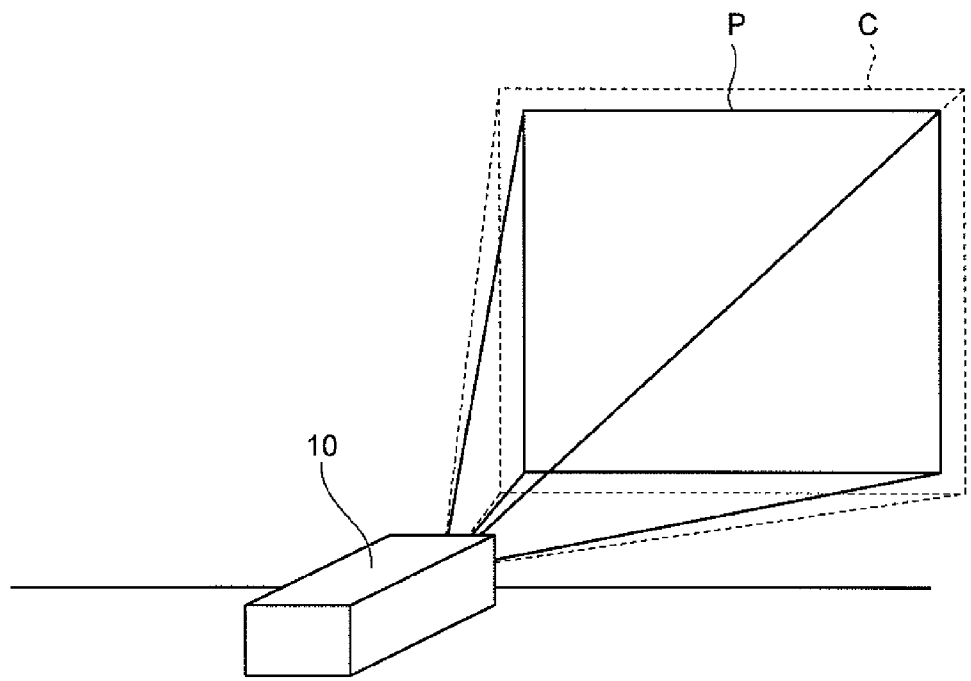
FIG. 3 is an explanatory view illustrating a state in which an image is displayed by a projector of the mobile electronic device illustrated in FIG. 1.

FIG. 3 is an explanatory view illustrating a state in which an image is displayed by the projector of the mobile electronic device illustrated in FIG. 1. As described above, the projector 34 is the image projecting unit that projects an image, and the image projecting surface thereof is exposed to the outside of the housing 11. Projecting an image from the projector 34 allows the mobile electronic device 10 to project the image on an area (projection area) P in an image projection target (e.g., a wall surface and a screen) at a position facing the image projecting surface of the projector 34 as illustrated in FIG. 3. The operation performed by the projector 34 is controlled by the processing unit 22, so that various types of video images, such as a moving image and a presentation material, sent from the processing unit 22 are projected and displayed on the projection area.

The projector 34 is formed with a light source, and an optical system that switches whether to project the light output from the light source in accordance with the image data. In the present embodiment, the light source of the projector 34 is laser light. The projector 34 is formed with the light source, and the optical system including a switching element that switches whether to transmit the light output from the light source, and a mirror that causes the light passing through the switching element to scan in a raster pattern. In this case, the angle of the light output from the laser light is changed by the mirror to scan the whole area of the image projection target with the light sent from the light source, thereby making it possible to project the image on the image projection target. Thus, the projector 34 is a projector of a scanning system.

It is to be noted that the configuration of the projector 34 is not limited to the configuration described above in which the laser is applied to the light source. For example, a projector in which a halogen light, an LED light source, or an LD light source is the light source, and an LCD or a Digital Micromirror Device (DMD) is applied to the optical system can be used as the projector 34.

The camera 36 is formed with, for example, an imaging element such as a Charge Coupled Device (CCD) image sensor. The camera 36 can capture the image projected by the projector 34. In other words, the camera 36 can capture the image projected on the image projection target by the projector 34. In the present embodiment, the imaging angle of view of the camera 36 is configured to be larger than the projection angle of view of the projector 34. This configuration makes an imaging area C of the camera 36 larger than the projection area P of the projector 34, thereby allowing the camera 36 to capture the whole image projected by the projector 34. The camera 36 may be prepared independently from a camera with which the user of the mobile electronic device 10 captures a landscape or the like, and be used only for capturing the image projected by the projector 34.

The light detection sensor 38 is a detection unit that detects the fact that the housing 11 is opened. If the housing 11 is opened for the purpose of altering the mobile electronic device 10 or the like, the light detection sensor 38 receives light outside of the housing 11, and outputs the fact. The disassembly determination unit 22h described above determines whether the housing 11 is opened based on the signal from the light detection sensor 38. In the present embodiment, when it is determined whether the predetermined image is projected by the projector 34, the disassembly determination unit 22h and the light detection sensor 38 are not necessary.

Figure 4:
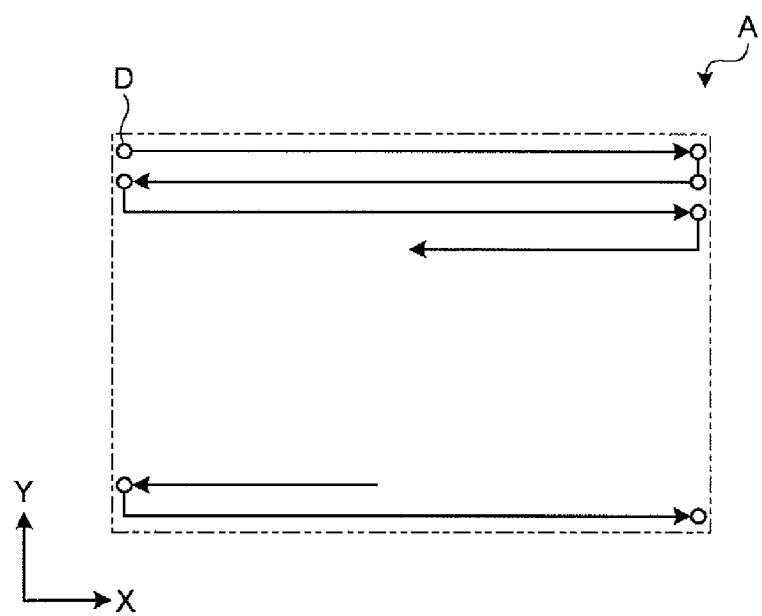
FIG. 4 is a schematic view illustrating a depicting method by a projector of a scanning system.

FIG. 4 is a schematic view illustrating a depicting method by a projector of a scanning system. An image A is depicted by causing a spot (light spot) D of the laser light sent from the projector 34 to scan in the X direction and the Y direction. At this time, the light spot D is caused to scan back and forth along the X direction, and in one direction along the Y direction. In the depiction performed by the projector 34, if the image A is a rectangle, the light spot D starts the scanning from one corner thereof, and then scans the whole area of the image A in the X direction and the Y direction. As a result, one depiction is completed, and the image A is depicted.

When the projector 34 projects an image, the image thus displayed is updated. An index indicating how many times the image is updated per unit time, that is, an index indicating the number of update per unit time is referred to as a frame rate, and is represented by the number of update per second. The frame rate represented by frequency is referred to as a frame frequency. If the frame frequency is f Hz, the image is updated f times per second. In other words, the depiction is performed f times per second.

In the present embodiment, in order to detect the fact that the predetermined image is projected by the projector 34, the processing unit 22 determines whether the projector 34 projects the predetermined image when the projector 34 projects the image based on first image information. If the processing unit 22 determines that the projector 34 fails to project the predetermined image, it can be determined that the state of the projector 34 changes from a normal state. Therefore, if the processing unit 22 determines that the projector 34 fails to project the predetermined image, the processing unit 22 suppresses, that is, reduces output (projector output) of the projector 34 for projecting the image from the level of this moment, or stops the output. The processing unit 22 determines whether the projector 34 projects the predetermined image based on the first image information for causing the projector 34 to project the predetermined image and second image information obtained by capturing the image projected by the projector 34 based on the first image information by the camera 36.

Figure 5:
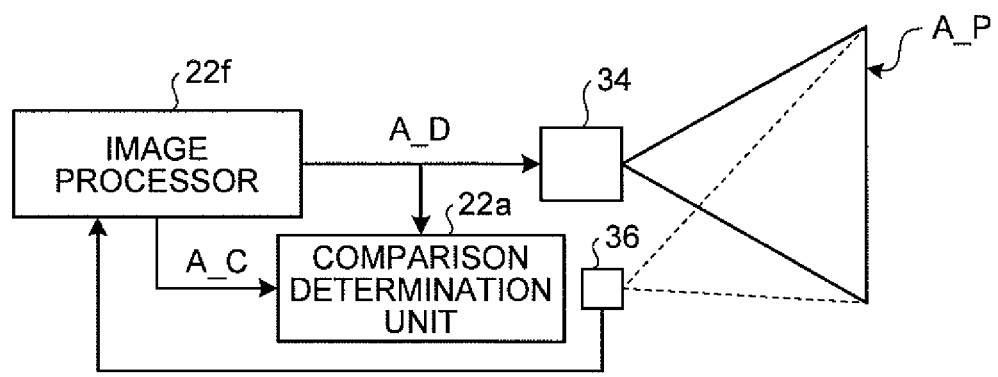
FIG. 5 is a control block diagram for determining whether a predetermined image is projected by the projector in the mobile electronic device according to the first embodiment.

FIG. 5 is a control block diagram for determining whether the predetermined image is projected by the projector in the mobile electronic device according to the first embodiment.

Figure 7A:
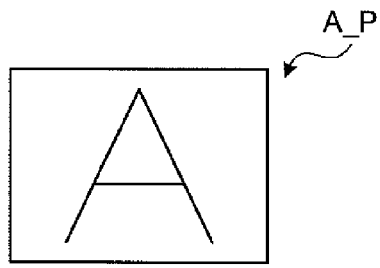
FIG. 7A is a schematic view of an image based on first image information projected by the projector that projects a predetermined image.
Figure 7B:
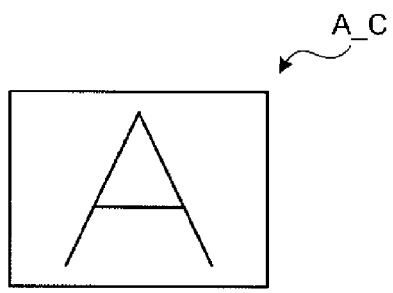
FIG. 7B is a schematic view of second image information obtained by capturing the predetermined image projected by the projector that projects the predetermined image by a camera.
Figure 7C:
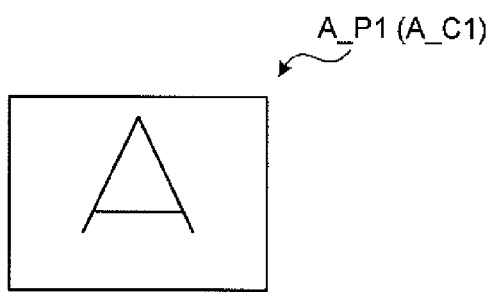
FIG. 7C is a schematic view of an image based on the first image information projected by the projector that fails to project the predetermined image.
Figure 7D:
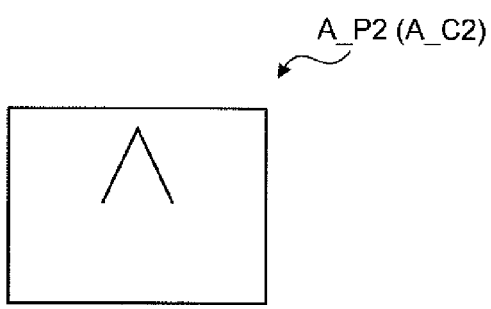
FIG. 7D is a schematic view of an image based on the first image information projected by the projector that fails to project the predetermined image.

FIG. 6 is a timing chart when it is determined whether the predetermined image is projected by the projector in the mobile electronic device according to the first embodiment. In FIG. 6, the horizontal axis represents time. FIG. 7A is a schematic view of an image based on the first image information projected by the projector that projects the predetermined image. FIG. 7B is a schematic view of the second image information obtained by capturing the predetermined image projected by the projector that projects the predetermined image by the camera. FIG. 7C and FIG. 7D are schematic views of images based on the first image information projected by the projector that fails to project the predetermined image.

The method for determining that the projector 34 fails to project the predetermined image will be described in greater detail. First, the image processor 22f of the processing unit 22 illustrated in FIG. 2 generates first image information A_D for causing the projector 34 to project the predetermined image, and transmits the first image information A_D to the projector 34. The projector 34 depicts the image based on the first image information A_D as illustrated in FIG. 4, and projects a predetermined image A_P. In other words, the first image information A_D is base information of the predetermined image A_P. The camera 36 captures the image projected by the projector 34 based on the first image information. The second image information A_C is the image information obtained by capturing the image projected based on the first image information by the camera 36, more specifically, the image information captured by the camera 36, and then processed so as to be compared with the first image information A_D in the image processor 22f.

The comparison determination unit 22a of the processing unit 22 acquires the first image information A_D output by the image processor 22f, and the second image information A_C captured by the camera 36 and processed in the image processor 22f to compare both pieces of information, and determines whether both pieces of the information coincide with each other. In this case, if the first image information A_D and the second image information A_C coincide with each other, the comparison determination unit 22a determines that the projector 34 projects the predetermined image. By contrast, as a result of the comparison, if the first image information A_D and the second image information A_C do not coincide with each other, the comparison determination unit 22a determines that the projector 34 fails to project the predetermined image.

As illustrated in FIG. 6, depicting time Tp represents the time during which the projector 34 depicts the image based on the first image information A_D, and exposure time Ts represents the time during which the camera 36 captures the image projected by the projector 34 based on the first image information. Time Tf illustrated in FIG. 6 is an update cycle of the image when the projector 34 projects the image, and is an inverse of the frame frequency. An inverse of the exposure time Ts of the camera 36 is shutter speed of the camera 36. The depicting time Tp is time during which the projector 34 outputs (that is, depicts) the image in the update cycle (image update period) Tf of the image. Because data change or the like occurs when the image is updated, the depicting time Tp is slightly shorter than the update cycle Tf of the image in consideration of the time required for the change or the like as illustrated in FIG. 6.

The frame rate is constant normally, that is, the update cycle Tf of the image is constant. As far as the projector 34 is in the normal state, the depicting time Tp is also constant. In the present embodiment, the exposure time Ts used when it is determined whether the projector 34 projects the predetermined image is identical to the depicting time Tp specified with respect to the update cycle Tf of the image on the premise that the projector 34 operates in the normal state. When it is determined whether the projector 34 projects the predetermined image, the capture performed by the camera 36 is synchronized with the update timing of the image. In other words, the exposure of the camera 36 is started at the timing when the update of the image is started, and is finished when the exposure time Ts has passed.

In this manner, the depicting time Tp during which the projector 34 projects the image based on the first image information A_D is made identical to the exposure time Ts of the camera 36 during which the camera 36 captures the image thus projected. This allows the camera 36 to perform the exposure for the predetermined image A_P projected and depicted by the projector 34 as it is, thereby enabling the camera 36 to capture an image identical to the image projected by the projector 34. In the period until the image projected by the projector 34 is updated, the exposure time Ts of the camera 36 may be made longer than the depicting time Tp of the projector 34 within the range shorter than the update cycle Tf (e.g., approximately 10%). This allows the camera 36 to capture the image projected by the projector 34 more reliably, thereby improving the accuracy for determining whether the projector 34 projects the predetermined image A_P.

FIG. 7A illustrates the predetermined image A_P when the predetermined image is projected by the projector 34, that is, when the image output of the projector 34 is in the state illustrated by (1) in FIG. 6. In this case, the projector 34 depicts the predetermined image A_P during the depicting time Tp. In the present embodiment, the depicting time Tp is identical to the exposure time Ts, and the camera 36 can capture an image identical to the image projected by the projector 34. Therefore, when the projector 34 operates in the normal state, all the pieces of the first image information A_D are output. As a result, image information (second image information A_C) obtained from the predetermined image A_P and captured by the camera 36 is the image illustrated in FIG. 7B. In this case, the second image information A_C obtained from the predetermined image A_P projected by the projector 34 in the normal state is identical to the first image information A_D.

When the state of the projector 34 changes from the normal state, the scanning speed in the depiction may be reduced. If the scanning speed of the projector 34 is reduced, all pieces of information that makes up one image cannot be output in the update cycle Tf. If the scanning speed of the projector 34 is reduced to 75% of that in the normal state thereof ((2) in FIG. 6), for example, all the pieces of the first image information A_D cannot be output in the update cycle Tf. Therefore, the image output by the projector 34 based on the first image information A_D changes like an image A_P1 illustrated in FIG. 7C.

Furthermore, if the scanning speed of the projector 34 is reduced to 50% of that in the normal state thereof ((3) in FIG. 6), for example, all the pieces of the first image information A_D cannot be output in the update cycle Tf. Therefore, the image output by the projector 34 based on the first image information A_D changes like an image A_P2 illustrated in FIG. 7D. F1 and F2 in FIG. 6 represent deficiencies of data (information) with respect to the first image information A_D output from the projector 34 in the update cycle Tf.

As described above, the predetermined image A_P projected by the projector 34 in the normal state based on the first image information A_D is different from the images A_P1 and A_P2 projected by the projector 34 whose state changes from the normal state based on the first image information A_D. Because the camera 36 can capture an image identical to the image projected by the projector 34, when the camera 36 captures the image A_P1 illustrated in FIG. 7C and the image A_P2 illustrated in FIG. 7D, images identical thereto are captured.

As a result, pieces of second image information A_C1 and A_C2 obtained by capturing the images A_P1 and A_P2, respectively, projected by the projector 34 whose state changes from the normal state based on the first image information by the camera 36 are different from the first image information A_D. More specifically, the pieces of the second image information A_C1 and A_C2 obtained from the images A_P1 and A_P2, respectively, projected by the projector 34 whose state changes from the normal state have data deficiencies with respect to the first image information A_D (data corresponding to F1 and F2 in FIG. 6).

Therefore, when the first image information A_D and the second image information A_C are different from each other, that is, when both pieces of the information do not coincide with each other, it can be determined that the projector 34 fails to project the predetermined image. For example, the comparison determination unit 22a compares the first image information A_D and the second image information A_C. If the inconsistency rate therebetween is equal to or larger than a predetermined threshold value (e.g., 10%), the comparison determination unit 22a determines that the first image information A_D and the second image information A_C do not coincide with each other.

Figure 8A:
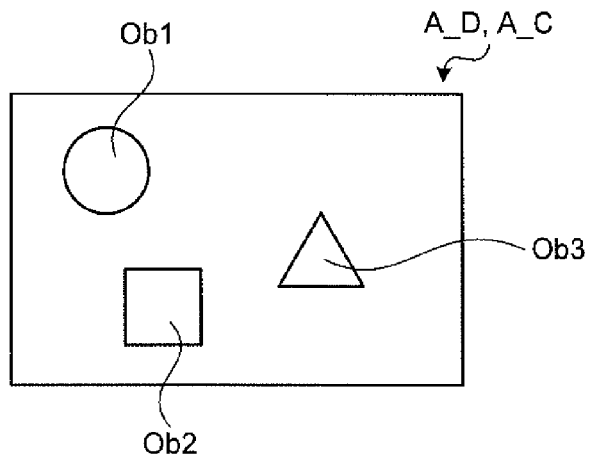
FIG. 8A is an explanatory view of a method for comparing the first image information and the second image information.
Figure 8B:
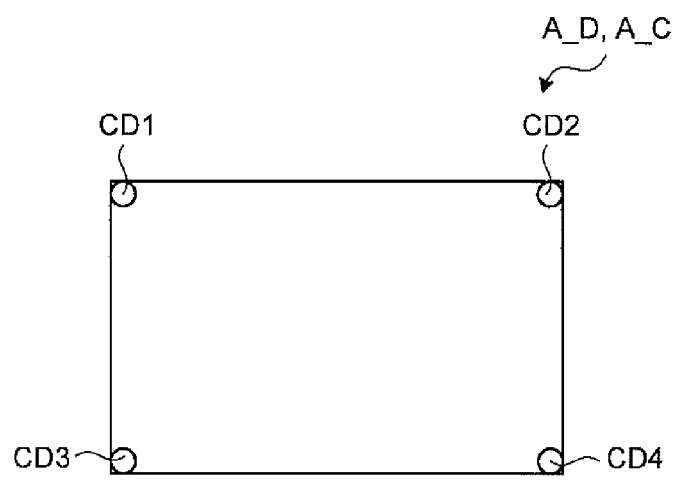
FIG. 8B is an explanatory view of a method for comparing the first image information and the second image information.
Figure 8C:
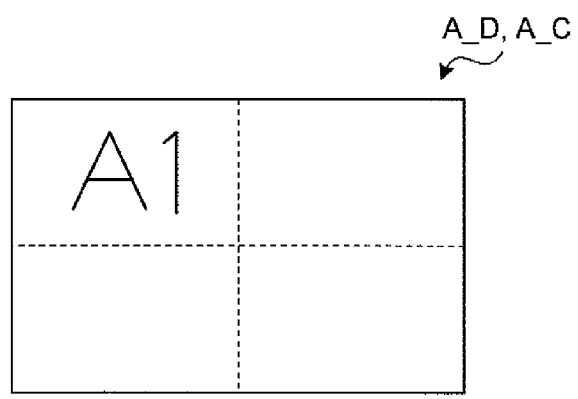
FIG. 8C is an explanatory view of a method for comparing the first image information and the second image information.

FIG. 8A to FIG. 8C are explanatory views of methods for comparing the first image information and the second image information. When the first image information A_D is compared with the second image information A_C, for example, characteristic portions (image characteristic portions) in the first image information A_D and the second image information A_C are extracted to be compared with each other. The image characteristic portions include an edge, a character, and a shape in the image. In the example illustrated in FIG. 8A, the shapes of image characteristic portions Ob1, Ob2, and Ob3 are extracted to be compared as the image characteristic portions, for example.

In this case, for example, if the consistency rate between the image characteristic portions of the first image information A_D and the image characteristic portions of the second image information A_C is equal to or larger than a predetermined threshold value, it may be determined that the first image information A_D and the second image information A_C coincide with each other. Alternatively, if the image characteristic portion arranged at a predetermined position in the first image information A_D is identical to the image characteristic portion corresponding to the predetermined position in the second image information A_C, it may be determined that the first image information A_D and the second image information A_C coincide with each other. The image characteristic portions are extracted by, for example, adding an extract function of the image characteristic portions to the comparison determination unit 22a of the processing unit 22 illustrated in FIG. 2. The comparison determination unit 22a compares the image characteristic portions thus extracted.

When the first image information A_D is compared with the second image information A_C, for example, four corners (CD1 to CD4) of the first image information A_D to be compared and four corners (CC1 to CC4) of the second image information A_C may be extracted to be compared with each other as illustrated in FIG. 8B. In the comparison between the four corners extracted from the first image information A_D and those extracted from the second image information A_C, if all the four corners coincide with those corresponding thereto, it is determined that the first image information A_D and the second image information A_C coincide with each other. If any one of the four corners thus extracted is different from that corresponding thereto, it is determined that the first image information A_D and the second image information A_C do not coincide with each other. The four corners of the image information are extracted by, for example, adding a function for extracting the four corners of the image information to the comparison determination unit 22a of the processing unit 22 illustrated in FIG. 2. The comparison determination unit 22a compares the four corners thus extracted.

Furthermore, when the first image information A_D is compared with the second image information A_C, for example, a part of the first image information A_D to be compared, and a part of the second image information A_C may be extracted to be compared with each other. In the example illustrated in FIG. 8C, a part A1 of the first image information A_D, and the part A1 of the second image information A_C are extracted for comparison to determine whether they are identical to each other. As a result, if the parts thus extracted are identical to each other, it is determined that the first image information A_D and the second image information A_C coincide with each other. If the parts thus extracted are different from each other, it is determined that the first image information A_D and the second image information A_C do not coincide with each other. The parts are extracted by, for example, adding a function for extracting the part of the image information to the comparison determination unit 22a of the processing unit 22 illustrated in FIG. 2. The comparison determination unit 22a compares the parts thus extracted. A method for determining whether the predetermined image is projected by the projector 34 in the present embodiment will now be described.

Figure 9:
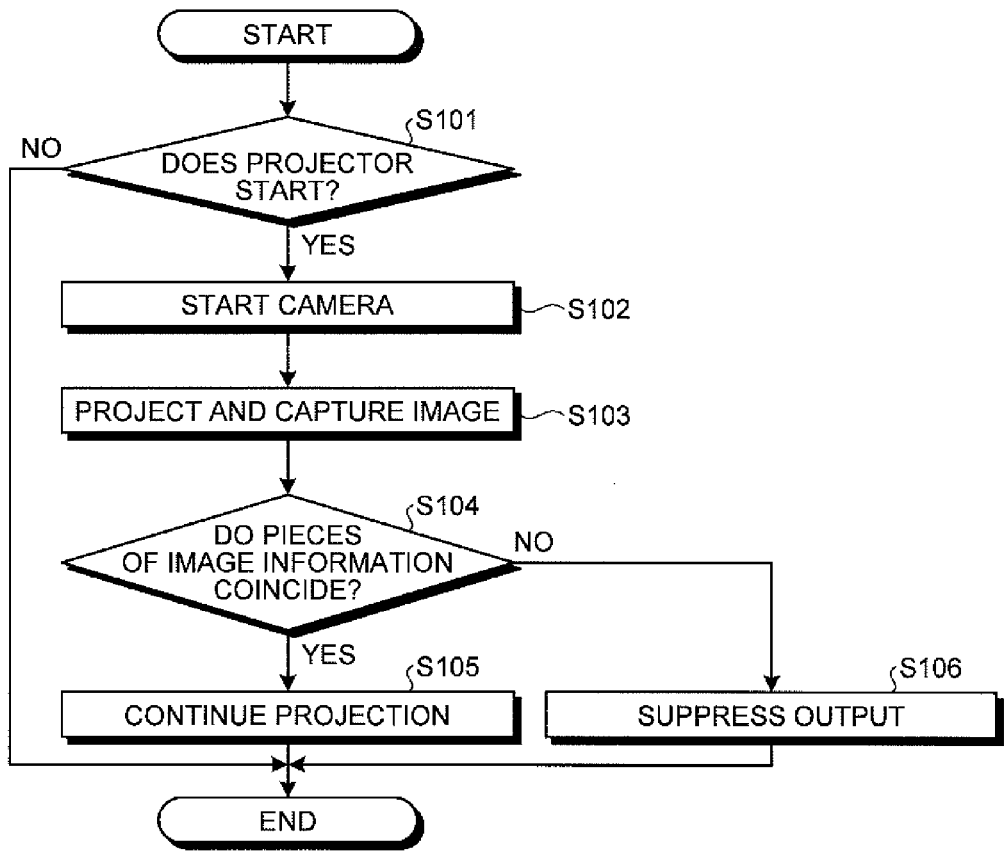
FIG. 9 is a flowchart illustrating a process of a method for determining whether the predetermined image is projected by the projector in the first embodiment.

FIG. 9 is a flowchart illustrating a process of the method for determining whether the predetermined image is projected by the projector in the first embodiment. At Step S101, the condition determination unit 22g of the processing unit 22 illustrated in FIG. 2 determines whether the projector 34 starts. If it is determined to be NO at Step S101, that is, if the processing unit 22 determines that the projector 34 is not operating, the determination is finished. If it is determined to be YES at Step S101, that is, if the condition determination unit 22g determines that the projector 34 is operating, the system control goes to Step S102.

At Step S102, the camera controller 22b of the processing unit 22 starts the camera 36. In this case, the camera controller 22b may start the camera 36 in synchronization with the start of the projector 34. Alternatively, the projector 34 may start in synchronization with the start of the camera 36. This makes it possible to determine whether the projector 34 projects the predetermined image rapidly. The camera controller 22b may start the camera 36 after predetermined time has passed since the start of the projector 34. This allows the camera 36 to capture the image projected by the projector 34 after the projector output of the projector 34 is stabilized. The projector controller 22c may start the projector 34 after predetermined time has passed since the start of the camera 36.

When the camera 36 starts, the system control goes to Step S103, and the projector controller 22c of the processing unit 22 causes the projector 34 to project the predetermined image A_P generated by the image processor 22f based on the first image information A_D. The camera controller 22b causes the camera 36 to capture the image projected by the projector 34 based on the first image information. Subsequently, the system control goes to Step S104, and the comparison determination unit 22a acquires the first image information A_D from the image processor 22f, and acquires the second image information A_C obtained from the image captured by the camera 36. The second image information A_C is generated by performing predetermined processing such as AD conversion on the image captured by the camera 36 by the image processor 22f. The comparison determination unit 22a then compares the first image information A_D and the second image information A_C to determine whether they coincide with each other.

If it is determined to be YES at Step S104, that is, if the comparison determination unit 22a determines that the first image information A_D and the second image information A_C coincide with each other, it can be determined that the projector 34 projects the predetermined image A_P based on the first image information A_D properly. In this case, the system control goes to Step S105, and the projector controller 22c acquires the determination result that the first image information A_D and the second image information A_C coincide with each other from the comparison determination unit 22a. The projector controller 22c does not change the projector output of the projector 34, and continues the projection performed by the projector 34.

If it is determined to be NO at Step S104, that is, if the comparison determination unit 22a determines that the first image information A_D and the second image information A_C do not coincide with each other, it can be determined that the projector 34 fails to project the predetermined image A_P based on the first image information A_D. In this case, the system control goes to Step S106, and the projector controller 22c acquires the determination result that the first image information A_D and the second image information A_C do not coincide with each other from the comparison determination unit 22a. The projector controller 22c then suppresses the projector output of the projector 34. This reduces electric power consumed by the projector 34 when the projector 34 fails to project the predetermined image A_P, thereby making it possible to lower wasted power consumption. Furthermore, when the laser light is used for the light source of the projector 34, for example, the situation in which the laser light projected by the projector 34 is sent intensively can be prevented from occurring.

While the projector 34 is operating, the first image information A_D and the second image information A_C may be compared with each other constantly to determine whether the projector 34 projects the predetermined image A_P. However, if it is determined whether the projector 34 projects the predetermined image A_P constantly, the load of the processing unit 22 increases. Therefore, as in the present embodiment, it may be determined whether the projector 34 projects the predetermined image A_P when the projector 34 starts. Furthermore, when it is determined whether the projector 34 projects the predetermined image A_P while the projector 34 is operating, the determination may be made at predetermined timings (e.g., every 30 seconds). This configuration make it possible, even if the projector 34 fails to project the predetermined image A_P during the operation of the projector 34, to detect the fact and suppress the projector output while reducing the load of the processing unit 22.

If it is determined that the projector 34 fails to project the predetermined image A_P based on the first image information A_D, the projector output is suppressed at Step S106. In addition to this, the notification controller 22d of the processing unit 22 may cause a notification unit illustrated in FIG. 1 and FIG. 2 of the mobile electronic device 10 to notify information indicating that the projector 34 fails to project the predetermined image. If the notification unit is the display 12, for example, the notification controller 22d changes the background color of the display 12 into red, or causes the display 12 to display a message indicating that the predetermined image is not projected by the projector 34. Furthermore, if the notification unit is the speaker 17, the notification controller 22d causes the speaker 17 to output a warning tone. Notifying the information indicating that the predetermined image is not projected by the projector 34 in this manner enables the user of the mobile electronic device 10 to recognize that the state of the projector 34 may change from the normal state.

If it is determined that the projector 34 fails to project the predetermined image A_P based on the first image information A_D, the projector output is suppressed at Step S106. In addition to this, the information writing unit 22e of the processing unit 22 may cause the storage unit 24 illustrated in FIG. 2 of the mobile electronic device 10 to store therein information indicating that the predetermined image is not projected. With this configuration, if there is an instruction to start the projector 34 thereafter, the projector controller 22c reads the information stored in the storage unit 24. Based on the information, the projector controller 22c can cause the projector 34 not to start, or can suppress the projector output. When the projector 34 comes to be able to project the predetermined image, the information writing unit 22e deletes the information from the storage unit 24. With this configuration, if it is determined that the projector 34 fails to project the predetermined image once, the projector 34 does not start, or the projector output is suppressed until the projector 34 comes to be able to project the predetermined image, and the information is deleted from the storage unit 24.

Figure 10:
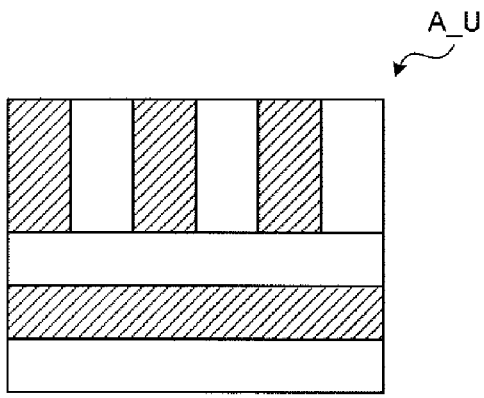
FIG. 10 is a schematic view of an example of a test image.

FIG. 10 is a schematic view of an example of a test image. In the present embodiment, image information for a test (test image information) used for determining whether the predetermined image is projected by the projector 34 may be prepared in advance, and used as the first image information to determine whether the predetermined image is projected by the projector 34. The test image in FIG. 10 illustrates a state in which the projector 34 projects a test image A_U.

The test image A_U is stored in the storage unit 24. When it is determined whether the predetermined image is projected by the projector 34, the projector controller 22c of the processing unit 22 performs processing such that the projector 34 projects the test image A_U when the projector 34 starts. More specifically, when the projector 34 starts, the projector controller 22c causes the image processor 22f to read test image information A_T stored in the storage unit 24, process the test image information A_T into a format projectable by the projector 34, and output the test image information A_T thus processed to the projector 34. This causes the projector 34 to depict and project the test image A_U as the predetermined image. The camera controller 22b performs processing such that the camera 36 captures the image projected based on the test image information A_T.

The test image A_U is preferably configured to be suitable for comparison between the first image information A_D and the second image information A_C by, for example, including a shape or a character distinct from other portions in the image characteristic portions, or causing the light spots to appear on the four corners of the image reliably. Using such a test image A_U further facilitates detecting whether the projector 34 projects the predetermined image.

In the present embodiment, as the cause that a precise image is not projected by the projector 34, the situation in which the projector 34 operates in a state different from the normal state is described. However, it is not limited thereto. For example, the causes that a precise image is not projected by the projector 34 include a case in which there is a person in the direction to which the image is projected. In such a case as well, the output of the projector 34 for projecting an image can be suppressed. In particular, when the laser light is used for the light source of the projector 34, suppressing the output can prevent the situation in which the person is irradiated with the laser light intensively from occurring.

Figure 11:
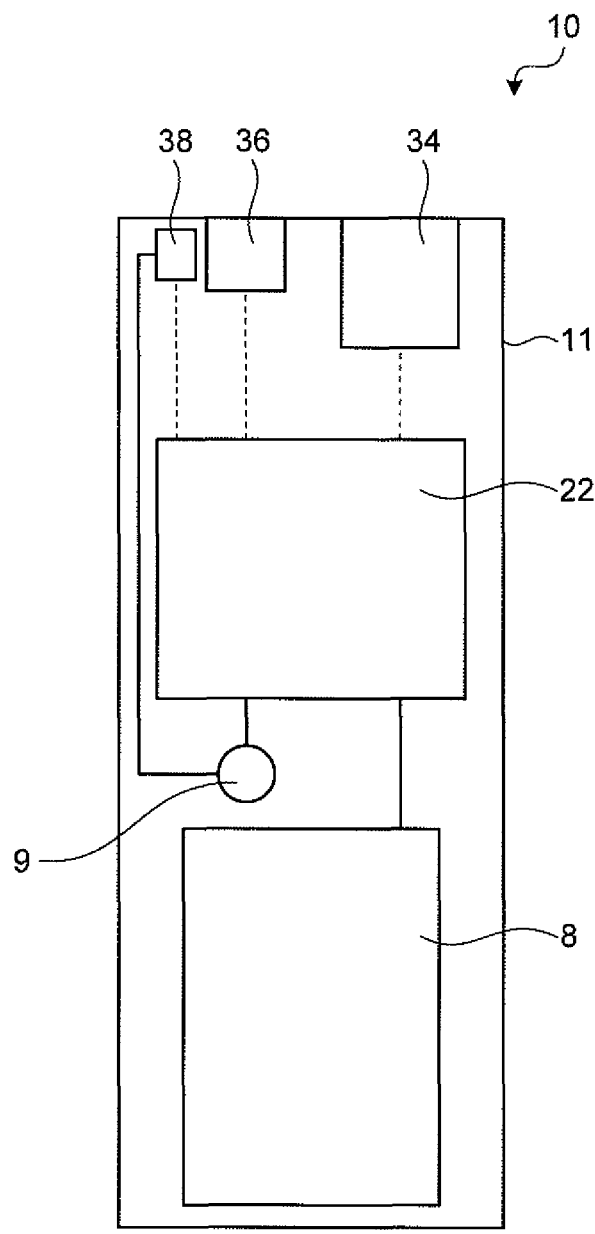
FIG. 11 is a schematic view of an exemplary arrangement of a light detection sensor in the mobile electronic device according to the first embodiment.

FIG. 11 is a schematic view of an exemplary arrangement of the light detection sensor in the mobile electronic device according to the first embodiment. In the mobile electronic device 10 illustrated in FIG. 1, it is assumed that, for example, the housing 11 may be opened to alter the light source and circuits on the periphery thereof for the purpose of increasing the amount of light of the projector 34. In this case, because the specification after the conversion is different from that of the mobile electronic device 10, and unexpected matters for the original specification can be occur.

In the present embodiment, when the specification of the mobile electronic device 10 is different from the original specification, a function (alteration or other modification assumption and protection function) for reducing the possibility of occurrence of an unexpected event may be added. The alteration or other modification assumption and protection function will now be described in greater detail. In the present embodiment, as illustrated in FIG. 11, the light detection sensor 38 is provided in the vicinity of the projector 34 inside the housing 11 of the mobile electronic device 10 as a detection unit that detects the fact that the housing 11 is opened. When receiving light, the light detection sensor 38 outputs a signal indicating the fact. Because the light detection sensor 38 is arranged inside the housing 11, the light detection sensor 38 does not receive light as far as the housing 11 is not opened.

As a result, if the housing 11 is opened, the light detection sensor 38 receives light for the first time, and outputs the signal indicating the fact. Thus, the light detection sensor 38 receives the light, thereby detecting the fact that the housing 11 is opened. In other words, the light detection sensor 38 is the detection unit that detects the fact that the housing 11 is opened. Using the light detection sensor 38 makes it possible to detect the fact that the housing 11 is opened in a relatively simple manner. If the light detection sensor 38 outputs the signal indicating the fact that light is received, that is, if the light detection sensor 38 detects the fact that the housing 11 is opened, the disassembly determination unit 22*h* of the processing unit 22 suppresses the projector output. The light detection sensor 38 is preferably arranged, for example, in a space surrounded by a rib provided inside the housing 11 so as not to receive light in a normal state arranged inside the housing 11. This allows the light detection sensor 38 to receive light reliably only when the housing 11 is opened.

The mobile electronic device 10 has a battery 8 serving as a power source mounted thereon. The battery 8 supplies electric power to the projector 34, the camera 36, and the processing unit 22. In the present embodiment, an auxiliary battery 9 is further provided as a power source (auxiliary power source) different from the battery 8. If the battery 8 is removed, the auxiliary battery 9 supplies electric power to the light detection sensor 38 and the processing unit 22. Using the auxiliary battery 9 in this manner makes it possible to detect the fact that the housing 11 is opened even if the battery 8 is removed. Therefore, it is possible to assume alteration or other modification of the projector 34 more reliably. A processing process of the processing unit 22 when it is detected that the housing 11 is opened will now be described.

Figure 12:
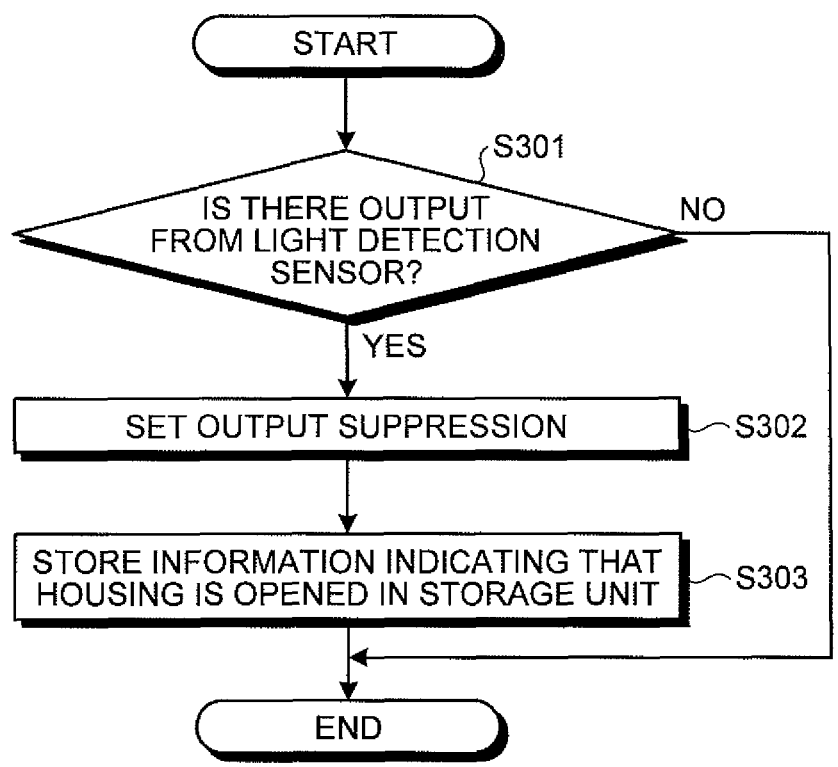
FIG. 12 is a flowchart of an exemplary processing process when a housing is opened.

FIG. 12 is a flowchart of an exemplary processing process when the housing is opened. When the housing 11 is opened, light enters into the housing 11, and the light detection sensor 38 receives the light. Thus, the light detection sensor 38 detects that the housing 11 is opened, and outputs the signal indicating the fact that the light is received. At Step S301, if the disassembly determination unit 22*h* acquires the signal indicating the fact that the light is received from the light detection sensor 38 (YES at Step S301), the system control goes to Step S302. Because the light detection sensor 38 receives the light, it can be determined that the housing 11 is opened. Because the housing 11 is not opened normally, if the housing 11 is opened, it can be assumed that some kind of alteration, such as alteration of the projector 34, is performed on the mobile electronic device 10.

Therefore, at Step S302, the disassembly determination unit 22*h* that acquires the signal indicating the fact that the light is received sets the output of the projector 34 to be suppressed. Based on the setting performed by the disassembly determination unit 22*h*, the projector controller 22*c* suppresses the projector output if the projector 34 is projecting the image at this time. In this manner, if it is assumed that the projector 34 is altered, the projector controller 22*c* suppresses the output of the projector 34.

If the output of the projector 34 is set to be suppressed, the system control goes to Step S303, and the information writing unit 22*e* causes the storage unit 24 to store therein information indicating that the housing 11 is opened. With this configuration, if there is an instruction to start the projector 34 after the housing 11 is closed, the projector controller 22*c* reads the information stored in the storage unit 24. Based on the information, the projector controller 22*c* can cause the projector 34 not to start, or can suppress the projector output. When the alteration or other modification of the projector 34 is resolved, the information writing unit 22*e* deletes the information from the storage unit 24. With this configuration, if the housing 11 is opened once, and alteration or other modification of the projector 34 is assumed, the projector 34 does not start, or the projector output is suppressed until the alteration or other modification of the projector 34 is resolved, and the information is deleted from the storage unit 24. Causing the storage unit 24 to store therein the information indicating that the housing 11 is opened enables a designer, a manufacturer, and the like of the mobile electronic device 10 to recognize the fact that unintended alteration or other modification is performed.

If the fact that the light detection sensor 38 receives light is detected, and it is determined that the housing 11 is opened, the storage unit 24 is caused to store therein the information indicating that the housing 11 is opened. In addition to this, the notification controller 22*d* may cause the notification unit illustrated in FIG. 1 and FIG. 2 of the mobile electronic device 10 to notify information indicating that the housing 11 is opened. If the notification unit is the display 12, for example, the notification controller 22*d* changes the background color of the display 12 into red, or causes the display 12 to display a message indicating that the projector 34 cannot be used because the housing 11 is opened. Furthermore, if the notification unit is the speaker 17, the notification controller 22*d* causes the speaker 17 to output a warning tone. The information indicating that the housing 11 is opened is notified in this manner, thereby making it possible to alert the user of the mobile electronic device 10.

In the present embodiment, the light detection sensor 38 is used as the detection unit. However, the detection unit is not limited thereto. For example, a touch sensor may be provided to a portion of the projector 34 arranged inside the housing 11, or a portion required for removing the projector 34 so as to detect a touch to the projector 34. Because the projector 34 is arranged inside the housing 11 normally, if a touch to or removal of the projector 34 is detected, it is assumed that the projector 34 is altered.

In the present embodiment, the mobile electronic device 10 may be configured so as to realize the alteration or other modification assumption and protection function alone without having the function to determine whether the predetermined image is projected by the projector 34. In this case, the mobile electronic device 10 needs to include at least the light detection sensor 38 serving as the detection unit, and the disassembly determination unit 22h and the projector controller 22c of the processing unit 22. More preferably, the mobile electronic device 10 includes the information writing unit 22e and the notification controller 22d of the processing unit 22, and the display 12 or the speaker 17 serving as the notification unit. If the mobile electronic device 10 is configured to realize the alteration or other modification assumption and protection function alone, following inventions are grasped from the present embodiment.

A first invention is a mobile electronic device characterized by including an image projecting unit that projects an image, a imaging unit that captures the image projected by the image projecting unit, a detection unit that is provided in the vicinity of the image projecting unit inside a housing of the mobile electronic device, and that detects the fact that the housing is opened, and a processing unit that suppresses output of the image projecting unit for projecting the image if the detection unit detects the fact that the housing is opened. According to the first invention, alteration or other modification of the image projecting unit is assumed based on the fact that the housing is opened, and the output of the image projecting unit is suppressed.

In a second invention, in the mobile electronic device according to the first invention, the detection unit is preferably driven by a power source different from a power source that drives the image projecting unit.

In a third invention, in the mobile electronic device according to one of the first invention or the second invention, the detection unit is preferably a light detection sensor.

In a fourth invention, in the mobile electronic device according to any one of the first invention to the third invention, the processing unit preferably causes a notification unit included in the mobile electronic device to notify information indicating that the housing is opened if the detection unit detects the fact that the housing is opened.

In a fifth invention, in the mobile electronic device according to any one of the first invention to the third invention, the processing unit preferably causes a storage unit included in the mobile electronic device to store therein information indicating that the housing is opened if the detection unit detects the fact that the housing is opened.

Second Embodiment

A second embodiment is nearly the same as the first embodiment. The second embodiment, however, is characterized in that it is determined whether a projector can project a predetermined visible image based on whether the projector mounted on a mobile electronic device projects a predetermined invisible image using an invisible image projected by invisible light. Other configuration is the same as that of the first embodiment. It is to be noted that the mobile electronic device according to the second embodiment, in the same manner as in the first embodiment, may include an alteration or other modification assumption and protection function realized by using a light detection sensor as a detection unit, for example.

Figure 13:
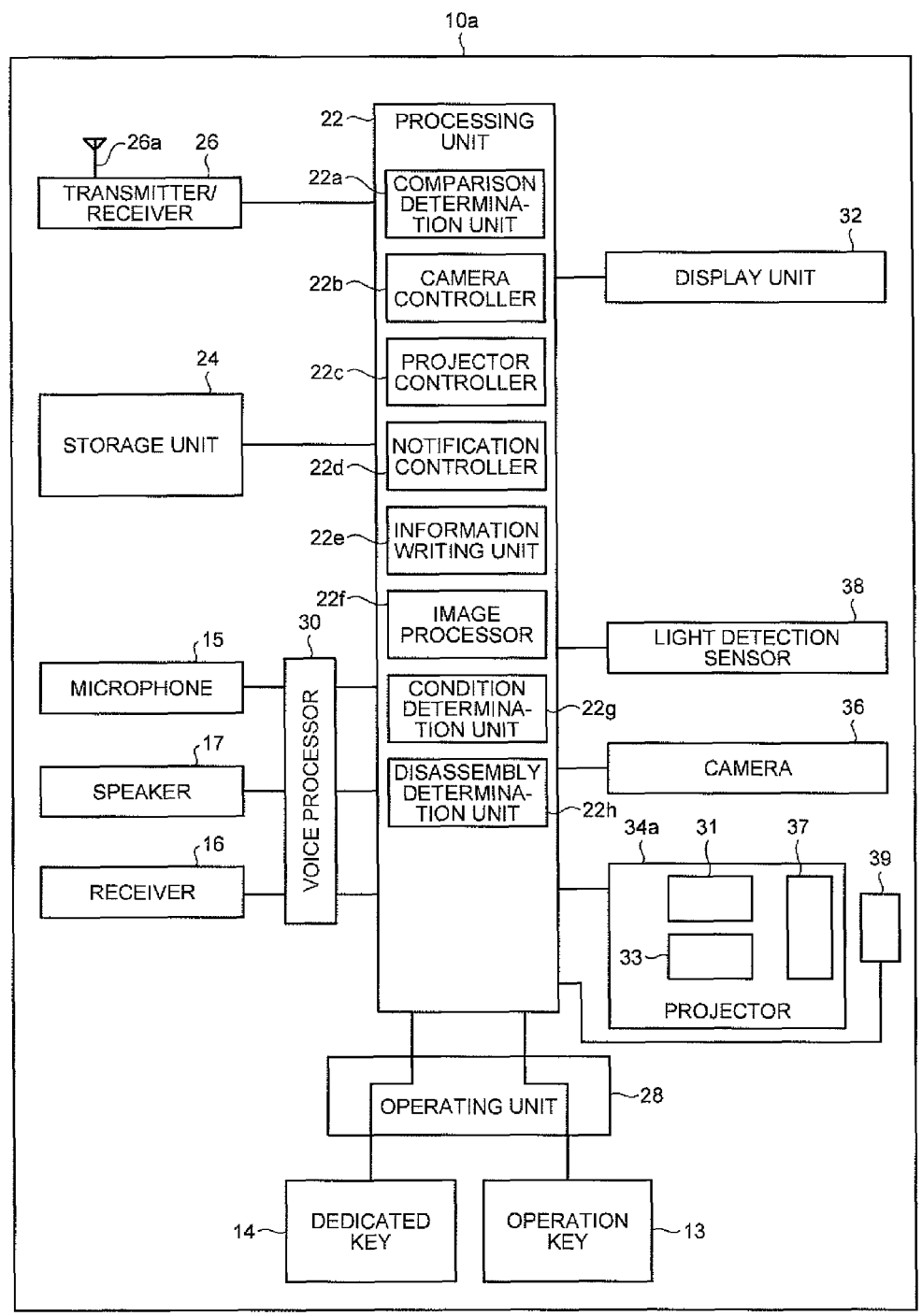
FIG. 13 is a block diagram of a schematic configuration of functions of a mobile electronic device according to a second embodiment.
Figure 14:
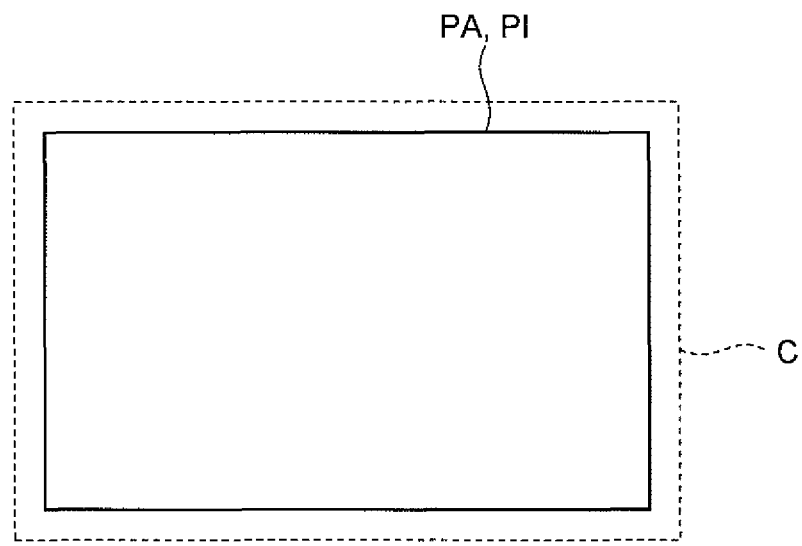
FIG. 14 is a schematic view illustrating a relationship between a visible image, an invisible image, and an imaging area.
Figure 15:
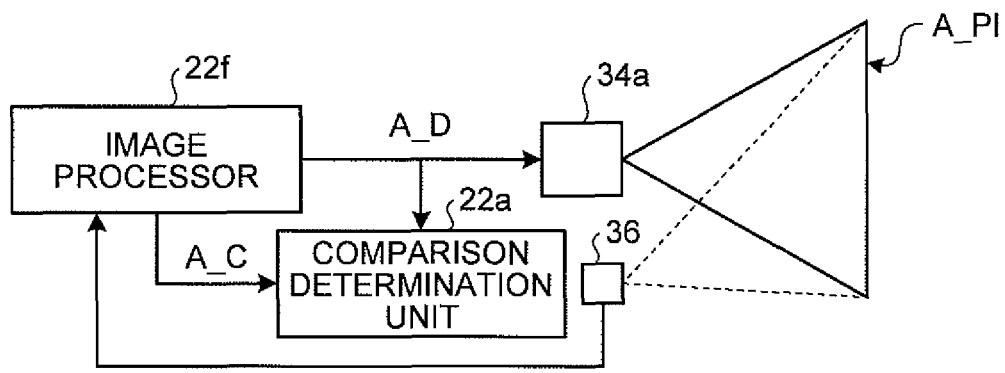
FIG. 15 is a control block diagram for determining whether a predetermined invisible image is projected by a projector in the mobile electronic device according to the second embodiment.

FIG. 13 is a block diagram of a schematic configuration of functions of the mobile electronic device according to the second embodiment. FIG. 14 is a schematic view illustrating a relationship between a visible image, an invisible image, and an imaging area. FIG. 15 is a control block diagram for determining whether the predetermined invisible image is projected by the projector in the mobile electronic device according to the second embodiment. As illustrated in FIG. 13, a projector 34a serving as an image projecting unit provided to a mobile electronic device 10a includes a visible light irradiation device (visible light irradiation unit) 31, an invisible light irradiation device (invisible light irradiation unit) 33, and a depicting device 37. Furthermore, the mobile electronic device 10a includes a focus adjustment device (focus adjustment device) 39 for adjusting the focus of an image projected by the projector 34a. It is to be noted that the visible light irradiation device 31, the depicting device 37, and the focus adjustment device 39 may also be included in the mobile electronic device 10 of the first embodiment.

The visible light irradiation device 31 is a light source of the projector 34a, and can send light in a visible light region (light equal to or more than 360-400 nm on the short wavelength side, and equal to or less than 760-830 nm on the long wavelength side). In the present embodiment, the visible light irradiation device 31 sends light in three colors of R (Red), G (Green), and B (Blue). The invisible light irradiation device 33 is a light source of the projector 34a, and can send light in an invisible light region (light less than 360-400 nm on the short wavelength side, and more than 760-830 nm on the long wavelength side). The invisible light irradiation device 33 sends light in the ultraviolet region and the infrared region, for example. In the present embodiment, the invisible light irradiation device 33 sends light in the infrared region. However, the invisible light irradiation device 33 may send light in the ultraviolet region.

In the present embodiment, laser light is used for light sources of the visible light irradiation device 31 and the invisible light irradiation device 33. However, their light sources are not limited thereto, and a halogen light, an LED light source or the like may also be used. With this configuration, the projector 34a can project both of a visible image (image projected by visible light), and an invisible image.

The depicting device 37 synthesizes the light in three colors sent from the visible light irradiation device 31, and irradiates an image projection target therewith. The depicting device 37 also irradiates the image projection target with the invisible light sent from the invisible light irradiation device 33. Furthermore, the depicting device 37 synthesizes the light in three colors sent from the visible light irradiation device 31 and the invisible light sent from the invisible light irradiation device 33, and irradiates the image projection target therewith. This allows the depicting device 37 to project a visible image including visible light alone, an invisible image including invisible light alone, or an image obtained by synthesizing a visible image and an invisible image on the image projection target.

The depicting device 37 is formed with an optical system that switches whether to project visible light or invisible light sent from the visible light irradiation device 31 or the invisible light irradiation device 33, respectively, serving as the light sources in accordance with image data. The depicting device 37 is, for example, formed with a switching element that switches whether to transmit the light output from the light source, and a mirror that causes the light passing through the switching element to scan in a raster pattern. For example, a Micro Electro Mechanical System (MEMS) mirror is used as the mirror. The MEMS mirror uses a piezoelectric element to drive the mirror, and causes the visible light sent from the visible light irradiation device 31 and the invisible light sent from the invisible light irradiation device 33 to scan, thereby generating a visible image and an invisible image. In this case, the angle of the light sent from the light source is changed by the mirror to scan the whole area of the image projection target with the light sent from the light source, thereby making it possible to project the visible image and the invisible image on the image projection target. Thus, similarly to the projector 34 of the first embodiment, the projector 34a is a projector of a scanning system.

The focus adjustment device 39 has a function (focus adjustment function) to focus the visible image and the invisible image projected from the depicting device 37 on the image projection target based on a command from the projector controller 22c. The focus adjustment device 39 includes a focus adjustment mechanism formed with a movable lens and the like, for example, and realizes the focus adjustment function by moving the lens. The focus adjustment device 39 may realize the focus adjustment function by performing predetermined image processing on the image data projected by the projector 34a by the image processor 22f. Furthermore, the focus adjustment device 39 may realize the focus adjustment function by the focus adjustment function and the image processing.

The camera 36 is an imaging unit, and in the same manner as in the first embodiment, is formed with an imaging element such as the CCD image sensor, for example. In the present embodiment, in the same manner as in the first embodiment, the imaging angle of view of the camera 36 is configured to be larger than the projection angle of view of the projector 34a. This configuration makes the imaging area C of the camera 36 larger than a projection area PA of the visible image, and a projection area PI of the invisible image projected by the projector 34a, thereby allowing the camera 36 to capture the whole visible image and the whole invisible image projected by the projector 34a.

In the present embodiment, the camera 36 captures both of the visible image and the invisible image. Therefore, in the camera 36, the bandwidth of light capable of being captured includes both of the band of the visible light sent from the visible light irradiation device 31, and the band of the invisible light sent from the invisible light irradiation device 33. The invisible image is in the wavelength outside of the wavelength range of the visible image. Therefore, if the camera 36 captures the visible image alone, a filter that transmits the band of the visible light alone is arranged before the imaging element of the camera 36. Furthermore, the band of the visible light alone is extracted from image information captured by the camera 36 by image processing performed by the image processor 22f.

If the camera 36 captures the visible image and the invisible image, the camera 36 causes light of all bands to enter into the imaging element. The image processor 22f then processes the image information captured by the camera 36 such that the band of the visible light and the band of the invisible light are included therein. If the camera 36 captures the invisible image alone, a filter that transmits the band of the invisible light alone is arranged before the imaging element of the camera 36. Furthermore, the band of the invisible light alone is extracted from the image information captured by the camera 36 by image processing performed by the image processor 22f.

The camera 36 may be used for capturing the invisible image alone. In this case, the camera 36 may capture the band of the invisible light sent from the invisible light irradiation device 33. If the invisible image alone is to be captured, infrared light may be applied to the invisible light sent from the invisible light irradiation device 33, and a light-receiving unit for infrared communications included in the mobile electronic device 10a may be used. With this configuration, an imaging unit for capturing the invisible image need not be newly provided, whereby manufacturing costs of the mobile electronic device 10a can be reduced. The camera 36 may be prepared independently from a camera with which the user of the mobile electronic device 10a captures a landscape or the like, and be used only for capturing the visible image and the invisible image projected by the projector 34a.

In the first embodiment, the camera 36 captures the predetermined image projected by the projector 34 mounted on the mobile electronic device 10 illustrated in FIG. 2, thereby determining whether the projector 34 projects the predetermine image (visible image). By contrast, in the present embodiment, the camera 36 captures the invisible image projected by the invisible light sent from the invisible light irradiation device 33 of the projector 34a mounted on the mobile electronic device 10a illustrated in FIG. 13, thereby determining whether the projector 34a projects the predetermined invisible image.

As illustrated in FIG. 15, the image processor 22f generates third image information A_D for causing the projector 34a to project the predetermined invisible image, and transmits the third image information A_D to the projector 34a. The projector 34a depicts the image based on the third image information A_D as illustrated in FIG. 15, and projects the predetermined invisible image. In other words, the third image information A_D is base information of the predetermined invisible image. The camera 36 captures an invisible image A_PI projected by the projector 34a based on the third image information. The fourth image information A_C is the image information obtained by capturing the invisible image A_PI projected based on the third image information by the camera 36, more specifically, the image information captured by the camera 36, and then processed so as to be compared with the third image information A_D in the image processor 22f.

The comparison determination unit 22a of the processing unit 22 acquires the third image information A_D output by the image processor 22f, and the fourth image information A_C captured by the camera 36 and processed in the image processor 22f to compare both pieces of information, and determines whether both pieces of the information coincide with each other. In this case, if the third image information A_D and the fourth image information A_C coincide with each other, the comparison determination unit 22a determines that the projector 34a projects the predetermined invisible image, and that the projector 34a operates in a normal state. By contrast, as a result of the comparison, if the third image information A_D and the fourth image information A_C do not coincide with each other, the comparison determination unit 22a determines that the projector 34a fails to project the predetermined invisible image.

Whether the third image information A_D coincides with the fourth image information A_C, that is, whether the third image information A_D is identical to the fourth image information A_C is determined in the same manner as in the first embodiment. In other words, the depicting time Tp during which the projector 34a projects the invisible image based on the third image information A_D is identical to the exposure time Ts during which the camera 36 captures the invisible image thus projected. The comparison determination unit 22a compares the fourth image information A_C obtained from the invisible image captured by the camera 36 under such a condition with the third image information A_D.

In the present embodiment, the invisible image projected by the invisible light is used, thereby determining whether the projector 34a projects a precise image. Because an invisible image is not recognized by the human eye, a person who sees the invisible image does not feel the glare. Furthermore, because invisible light is not recognized by the human eye, the invisible light irradiation device 33 may send the invisible light with the minimum output for the camera 36 to capture an image. This makes it possible to make the output low in the invisible light irradiation device 33.

In order to determine whether the projector 34a projects the predetermined invisible image, the invisible light irradiation device 33 may project the same image as the visible image projected by the visible light irradiation device 31 illustrated in FIG. 13. Alternatively, in the same manner as in the first embodiment, a dedicated test image for determining whether the projector 34a projects the predetermined invisible image may be used.

Figure 16:
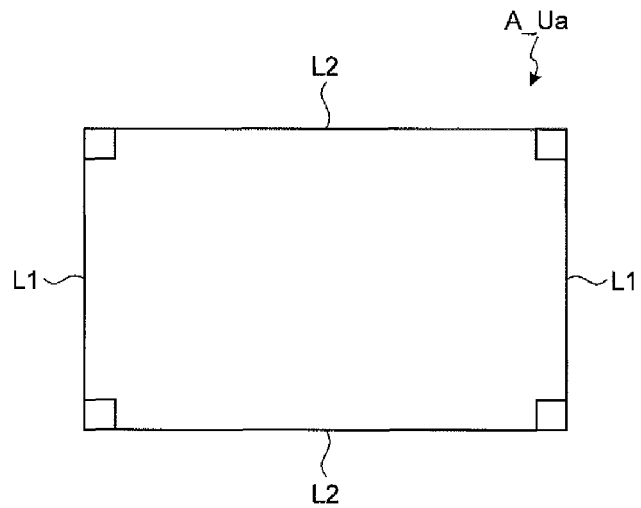
FIG. 16 is a schematic view of an example of a test image according to the second embodiment.

FIG. 16 is a schematic view of an example of the test image according to the second embodiment. An image for test (test image) A_Ua is an image projected by invisible light. The test image A_Ua is a rectangular image including a pair of sides (first sides) L1 and L1 in parallel to each other, and a pair of sides (second sides) L2 and L2 perpendicular to the first sides L1 and L1, respectively, and in parallel to each other. It is to be noted that the test image A_Ua may be a square. The test image A_Ua is in a size large enough to include the whole depicting area in which the projector 34a can perform the depiction.

In the case where the test image A_Ua is a rectangle or a square, if the whole depicting area of the projector 34a is irradiated with the invisible light uniformly in the shape of the test image A_Ua, that is, with the ratio between the first side L1 and the second side L2 being the same as that of the test image A_Ua, it is determined that the projector 34a projects the predetermined invisible image. By contrast, if a part of the whole depicting area of the projector 34a is irradiated with the invisible light in a different shape from that of the test image A_Ua, for example, with the ratio between the first side L1 and the second side L2 being different from that of the test image A_Ua, it is determined that the projector 34a fails to project the predetermined invisible image.

By making the test image A_Ua a rectangle or a square, it is possible to determine whether the projector 34a projects the predetermined invisible image as far as the invisible image in the same shape as that of the test image A_Ua can be detected, even if the test image A_Ua projected on the image projection target is out of focus to some extent. In the first embodiment, that is, even in the case where the visible image is used, the same advantageous effects as those of the present embodiment can be obtained by making the shape of the test image a rectangle or a square. It is to be noted that the test image A_Ua is not limited to a rectangle or a square, and may be in other shapes. The test image A_Ua may be a character, a figure or the like, or a combination thereof.

Figure 17:
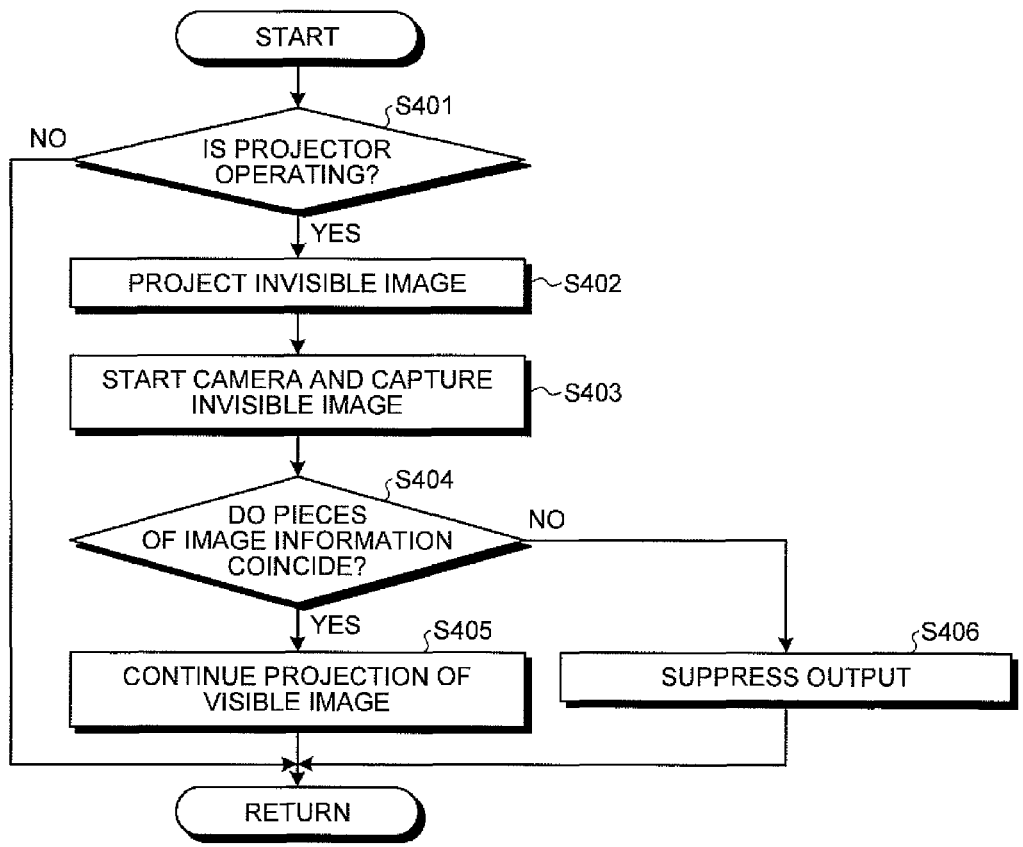
FIG. 17 is a flowchart illustrating a process of a method for determining whether the predetermined invisible image is projected by the projector in the second embodiment.

FIG. 17 is a flowchart illustrating a process of a method for determining whether the predetermined invisible image is projected by the projector in the second embodiment. This method is for determining whether the predetermined invisible image is projected while the projector 34a illustrated in FIG. 13 is operating, that is, while the projector 34a is projecting the visible image. At Step S401, the condition determination unit 22g of the processing unit 22 illustrated in FIG. 13 determines whether the projector 34a is operating, that is, whether the projector 34a projects the visible image.

If it is determined to be NO at Step S401, that is, if the processing unit 22 determines that the projector 34a is not operating, the determination is finished. If it is determined to be YES at Step S401, that is, if the condition determination unit 22g determines that the projector 34a is operating, the system control goes to Step S402. If the projector 34a is operating, the projector 34a projects the visible image on the image projection target.

At Step S402, the projector controller 22c of the processing unit 22 causes the projector 34a to project the predetermined invisible image generated by the image processor 22f based on the third image information A_D. Subsequently, the system control goes to Step S403, and the camera controller 22b causes the camera 36 to start and to capture the invisible image projected by the projector 34a based on the third image information A_D. At this time, the projector 34a may be caused to project the predetermined invisible image based on the third image information A_D after the camera 36 is caused to start.

Subsequently, the system control goes to Step S404, and the comparison determination unit 22a acquires the third image information A_D from the image processor 22f, and the fourth image information A_C obtained from the invisible image captured by the camera 36. The fourth image information A_C is generated by performing predetermined processing such as AD conversion on the invisible image captured by the camera 36 by the image processor 22f. The comparison determination unit 22a then compares the third image information A_D and the fourth image information A_C.

If it is determined to be YES at Step S404, that is, if the comparison determination unit 22a determines that the third image information A_D and the fourth image information A_C coincide with each other, it can be determined that the projector 34a projects the predetermined invisible image based on the third image information A_D. In this case, the system control goes to Step S405, and the projector controller 22c acquires the determination result that the third image information A_D and the fourth image information A_C coincide with each other from the comparison determination unit 22a. The projector controller 22c does not change the projector output of the projector 34a, and continues the projection performed by the projector 34a.

If it is determined to be NO at Step S404, that is, if the comparison determination unit 22a determines that the third image information A_D and the fourth image information A_C do not coincide with each other, it can be determined that the projector 34a fails to project the predetermined invisible image A_PI based on the third image information A_D. In this case, the system control goes to Step S406, and the projector controller 22c acquires the determination result that the third image information A_D and the fourth image information A_C do not coincide with each other from the comparison determination unit 22a. The projector controller 22c then suppresses the projector output of the projector 34a. This reduces electric power consumed by the projector 34a when the projector 34a fails to project the predetermined invisible image A_PI, thereby making it possible to lower wasted power consumption. Furthermore, when the laser light is used for the light source of the projector 34a, for example, the situation in which the laser light projected by the projector 34a is sent intensively can be prevented from occurring.

The determination whether the predetermined invisible image is projected may be made constantly while the projector 34a is operating, or made at predetermined timings. With the latter configuration, the load of the processing unit 22 can be reduced. At this time, in the same manner as in the first embodiment, if it is determined that the projector 34a fails to project the predetermined invisible image based on the third image information A_D, information indicating that the predetermined invisible image is not projected may be notified by a notification unit (e.g., the display unit 32) of the mobile electronic device 10a illustrated in FIG. 13. Furthermore, in the same manner as in the first embodiment, if it is determined that the projector 34a fails to project the predetermined invisible image based on the third image information A_D, the information indicating that the predetermined invisible image is not projected may be stored in the storage unit 24 of the mobile electronic device 10a illustrated in FIG. 13.

Figure 18:
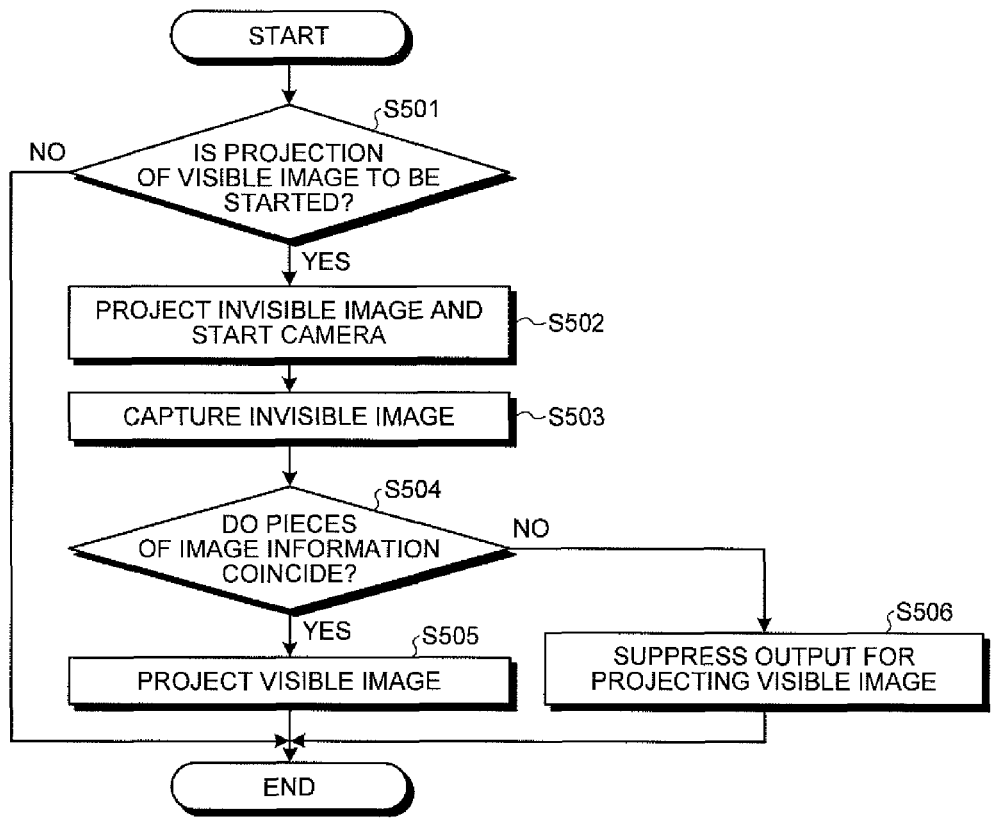
FIG. 18 is a flowchart illustrating a process of another method for determining whether the predetermined invisible image is projected by the projector in the second embodiment.

FIG. 18 is a flowchart illustrating a process of another method for determining whether the predetermined invisible image is projected by the projector in the second embodiment. This method is for determining whether the predetermined invisible image is projected before the projector 34a illustrated in FIG. 13 projects a visible image. At Step S501, the condition determination unit 22g of the processing unit 22 illustrated in FIG. 13 determines whether the projector 34a starts to project the visible image. For example, the condition determination unit 22g acquires a start command of the projector 34a input by the user of the mobile electronic device 10a, and determines that the projector 34a is about to start to project the visible image.

If it is determined to be NO at Step S501, that is, if it is determined that the projector 34a does not start to project the visible image, the determination is finished. If it is determined to be YES at Step S501, that is, if the condition determination unit 22g determines that the projector 34a is about to start to project the visible image, the system control goes to Step S502.

At Step S502, the projector controller 22c of the processing unit 22 causes the projector 34a to project the predetermined invisible image generated by the image processor 22f based on the third image information A_D. At this time, the camera controller 22b causes the camera 36 to start. The projector 34a may be caused to project the invisible image after the camera 36 is caused to start.

Subsequently, the system control goes to Step S503, and the camera controller 22b causes the camera 36 to capture the invisible image projected by the projector 34a based on the third image information A_D. At this time, the camera 36 may be caused to start after predetermined time has passed since the projector 34a started to project the invisible image. This allows the camera 36 to capture the invisible image projected by the projector 34a after the projector output of the projector 34a is stabilized.

Subsequently, the system control goes to Step S504, and the comparison determination unit 22a acquires the third image information A_D from the image processor 22f, and the fourth image information A_C obtained from the invisible image captured by the camera 36. The fourth image information A_C is generated by performing predetermined processing such as AD conversion on the invisible image captured by the camera 36 by the image processor 22f. The comparison determination unit 22a then compares the third image information A_D and the fourth image information A_C.

If it is determined to be YES at Step S504, that is, if the comparison determination unit 22a determines that the third image information A_D and the fourth image information A_C coincide with each other, it can be determined that the projector 34a projects the predetermined invisible image based on the third image information A_D. In this case, the system control goes to Step S505, and the projector controller 22c acquires the determination result that the third image information A_D and the fourth image information A_C coincide with each other from the comparison determination unit 22a, and causes the projector 34a to project the visible image.

In this case, the projector output of the projector 34a is not lowered from the initial setting value.

If it is determined to be NO at Step S504, that is, if the comparison determination unit 22a determines that the third image information A_D and the fourth image information A_C do not coincide with each other, it can be determined that the projector 34a fails to project the predetermined invisible image A_P based on the third image information A_D. In this case, the system control goes to Step S506, and the projector controller 22c acquires the determination result that the third image information A_D and the fourth image information A_C do not coincide with each other from the comparison determination unit 22a. The projector controller 22c then suppresses the output (projector output) of the projector 34a for projecting the visible image.

With this configuration, when the laser light is used for the light source of the projector 34a, for example, the situation in which the projector 34a sends the laser light intensively can be prevented from occurring. Furthermore, when the projector 34a fails to project the predetermined invisible image A_P, the electric power consumed by the projector 34a is reduced, whereby wasted power consumption can be lowered. If it is determined to be NO at Step S504, the projector controller 22c may stop the projection of the visible image performed by the projector 34a, that is, may make the projector output 0 at Step S506. This makes it possible to lower the wasted power consumption more effectively.

The method for determining whether the predetermined invisible image is projected described above is a method for determining whether the predetermined invisible image is projected before the projector 34a projects the visible image. Therefore, if the projector 34a fails to project the predetermined invisible image, the projection of the visible image can be stopped. As a result, it is possible to prevent the projector 34a that fails to project the predetermined invisible image from projecting the visible image.

Figure 19:
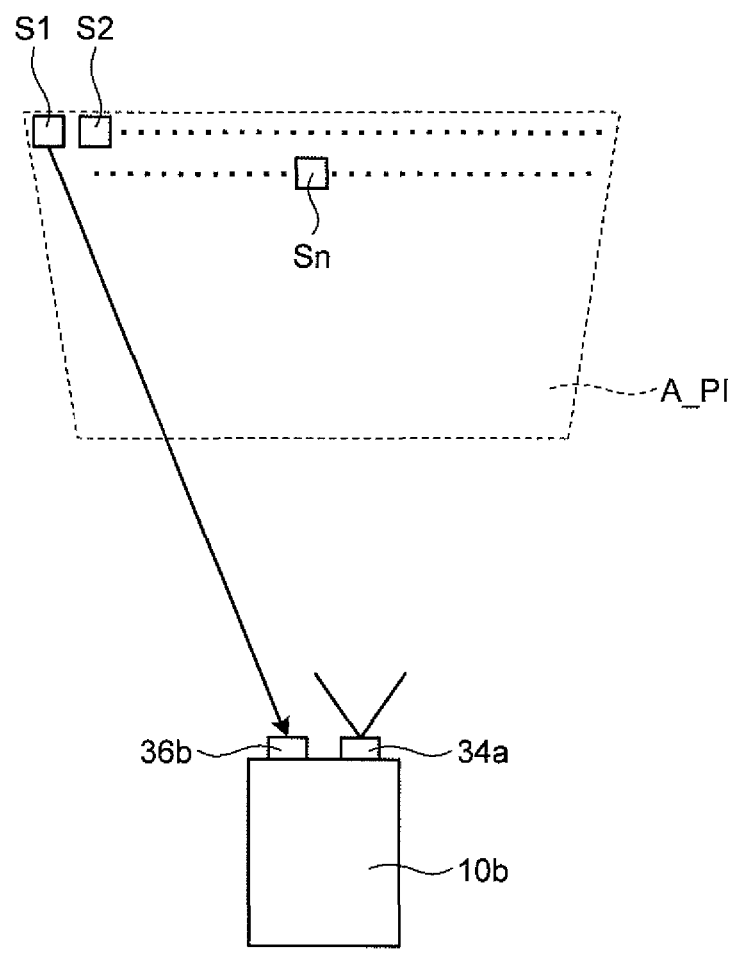
FIG. 19 is an explanatory view of a method for determining whether the predetermined invisible image is projected by using a photo detecting unit that detects reflected light of the invisible image projected by the projector instead of using the camera.

FIG. 19 is an explanatory view of a method for determining whether the predetermined invisible image is projected by using a photo detecting unit that detects reflected light of the invisible image projected by the projector instead of using the camera. A mobile electronic device 10b includes the projector 34a and a photodiode 36b serving as the photo detecting unit. It is to be noted that the photo detecting unit is not limited to the photodiode 36b, and a photoelectric tube, a photomultiplier tube, and a Position Sensitive Detector (PSD) can be used, for example. The mobile electronic device 10b is configured to have the photodiode 36b instead of the camera 36 included in the mobile electronic device 10a illustrated in FIG. 13, and other configuration is the same as that of the mobile electronic device 10a. Therefore, the same configuration is explained by using the configuration of the mobile electronic device 10a.

As illustrated in FIG. 19, the invisible image A_PI projected by the projector 34a is a collection of light spots of invisible light (invisible light spots) S1, S2, ..., Sn. In this method, the invisible light spot S1 and the like are detected by the photodiode 36b, and it is determined whether the projector 34a projects the predetermined invisible light. It is to be noted that the photodiode 36b detects reflected light of the invisible light spot S1 and the like. Hereinafter, detecting the reflected light of the invisible light spot by the photodiode 36b will be represented as detecting the invisible light spot by the photodiode 36b for convenience of the explanation.

In the method, the photodiode 36b detects the invisible light spot S1 and the like of the invisible image A_PI projected by the projector 34a based on the third image information A_D during the depicting time Tp. Because the third image information A_D is prepared in advance, it is possible to recognize the brightness distribution of the invisible light spot S1 and the like constituting the invisible image A_PI projected by the projector 34a during the depicting time Tp in advance.

Figure 20A:
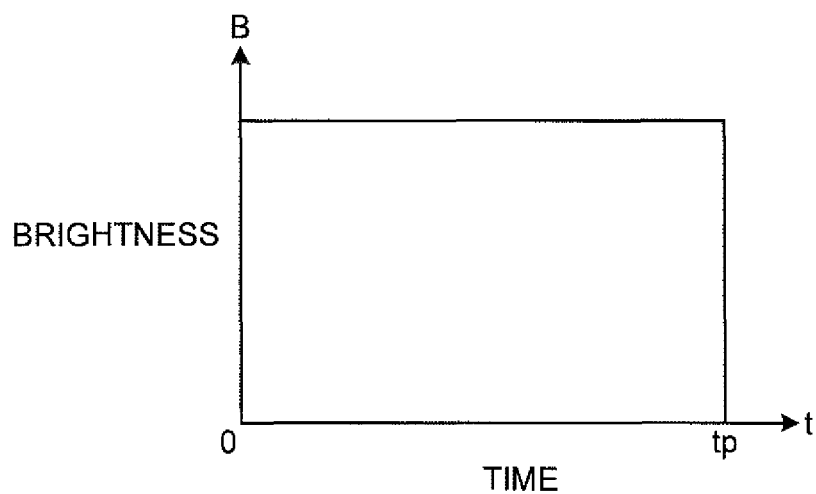
FIG. 20A is a view illustrating exemplary brightness distribution of invisible light spots of the invisible image detected by a photodiode during depicting time.
Figure 20B:
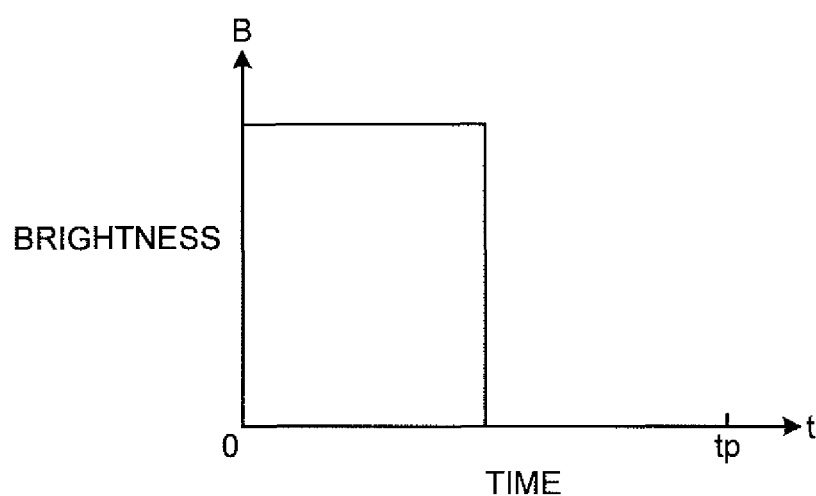
FIG. 20B is a view illustrating exemplary brightness distribution of the invisible light spots of the invisible image detected by the photodiode during the depicting time.

FIG. 20A and FIG. 20B are views illustrating exemplary brightness distribution of the invisible light spots of the invisible image detected by the photodiode during the depicting time. For example, the third image information A_D is a rectangular image in a size large enough to include the whole depicting area in which the projector 34a can perform the depiction, and all the area is depicted by the invisible light of the same output. In this case, if the projector 34a operates in the normal state, as illustrated in FIG. 20A, brightness B of the invisible light spot is stabilized from the start to the end of the depiction performed by the projector 34a, that is, during the depicting time Tp. By contrast, if the state of the projector 34a changes from the normal state, for example, the brightness B of the invisible light spot changes between the start and the end of the depiction performed by the projector 34a as illustrated in FIG. 20B.

In the method, the photodiode 36b detects the invisible light spot S1 and the like of the invisible image A_PI projected by the projector 34a based on the third image information A_D during the depicting time Tp (which may be the update cycle Tf). The comparison determination unit 22a of the processing unit 22 compares the brightness distribution of the invisible light spot S1 and the like thus detected with the brightness distribution of the invisible light spot S1 and the like corresponding to the third image information A_D in the case where the projector 34a operates in the normal state. Thus, the comparison determination unit 22a determines whether the projector 34a projects the predetermined invisible image. If the photodiode 36b is used, the mobile electronic device 10b need not include a camera.

In the above explanation, the brightness B of the invisible light spot S1 and the like is used as information used for determining whether the predetermined invisible image is projected by the projector 34a. However, the information is not limited thereto, and the amounts of light of the invisible light spot S1 and the like can also be used. Furthermore, in the above explanation, one photodiode 36b is used. However, the photodiode 36b may be provided in plurality (e.g., two photodiodes), and the determination described above may be made by using a difference of output between the invisible light spot S1 and the like detected by both of the photodiodes 36b. With this configuration, the positions of the invisible light spot S1 and the like can be recognized, thereby making it possible to correct a change in the brightness and a change in the amount of light caused by inclination between the photodiodes 36b and the invisible light spot S1 and the like. As a result, the accuracy of the determination can be improved.

Furthermore, in the above explanation, the invisible image is used as an example. However, the method can be applied to a visible image. In this case, the photodiode 36b detects light spots (visible light spots) of the visible light sent by the projector 34a, and thus it is determined whether the projector 34a projects the predetermined visible image in the same manner as in the case of the invisible image.

In the present embodiment, the invisible image projected by the invisible light is used, thereby determining whether the predetermined invisible image is projected by the projector. If it is determined whether the projector projects the predetermined invisible image by using the invisible image in this manner while the projector is projecting the visible image, an invisible image different from the visible image can also be used. With this configuration, an invisible image that facilitates the determination (e.g., a rectangular image in a size large enough to include the whole depicting area in which the projector 34a can perform the depiction) is projected together with the visible image, thereby making it possible to improve the accuracy of the determination.

The projector 34a included in the mobile electronic devices 10a and 10b in the present embodiment can send the invisible light. Therefore, the projector 34a can be used not only for the determination whether the predetermined invisible image is projected by the projector, but also for other uses. For example, an invisible image having a predetermined pattern is projected by the invisible light before the visible image is projected by the projector 34a, and automatic focusing is performed by the focus adjustment device 39 illustrated in FIG. 13 using the invisible image. The projector 34a is caused to project the visible image after the invisible image comes into focus. This can prevent a visible image that is out of focus from being projected. In addition to this use, a character can be projected by the invisible light to be used as digital watermarking.

The projector 34a included in the mobile electronic devices 10a and 10b in the present embodiment can project both of the invisible image and the visible image. Therefore, it is determined whether the projector projects the predetermined invisible image by using the invisible image normally. If the projector 34a cannot project the predetermined invisible image, the determination may be made by using the visible image.

INDUSTRIAL APPLICABILITY

As described above, the mobile electronic device according to the present invention is useful for a device including a device that can project an image, such as a projector.

The invention claimed is:
1. A mobile electronic device comprising:
an image projecting unit that projects an image in a projection area;
an imaging unit that captures the image projected by the image projecting unit, and
a processing unit that performs projection processing for causing the image projecting unit to project a predetermined image based on predetermined image information, wherein
the image projecting unit projects the predetermined image based on a first image information,
the imaging unit obtains a second image information by using a captured predetermined image projected by the image projecting unit,
the processing unit further comprises a comparison determination unit that determines whether the predetermined image is the same as the captured predetermined image by comparing the first image information and the second image information,
the processing unit suppresses projection performed by the image projecting unit when the comparison determination unit determines that the predetermined image is not the same as the captured predetermined image,
the predetermined image is projected by the image projecting unit in an area that is smaller than the projection area and is included in the projection area, and
the processing unit is configured to set the time, during which the image projecting unit projects the predetermined image based on the first image information, to be shorter than an updated cycle time during which the image is to be changed.

2. The mobile electronic device according to claim 1, wherein the processing unit makes the time during which the image projecting unit projects the predetermined image based on the first image information identical to exposure time during which the imaging unit captures the image projected by the image projecting unit based on the first image information.

3. The mobile electronic device according to claim 1, wherein the processing unit causes the imaging unit to start in response to start of the image projecting unit.

4. The mobile electronic device according to claim 1, wherein
the first image information is test image information for determining whether the predetermined image is projected by the image projecting unit, and
the processing unit causes the image projecting unit to project the test image information, and causes the imaging unit to capture an image projected based on the test image information.

5. The mobile electronic device according to claim 1, wherein
the image projecting unit projects a visible image and an invisible image,
the imaging unit captures a predetermined invisible image projected by the image projecting unit as the predetermined image, and
the processing unit suppresses projection of the visible image performed by the image projecting unit when determining that the predetermined invisible image is not projected from third image information for causing the image projecting unit to project the predetermined invisible image and fourth image information obtained by capturing the invisible image projected by the image projecting unit based on the third image information by the imaging unit.

6. The mobile electronic device according to claim 5, wherein the processing unit makes the time during which the image projecting unit projects the predetermined invisible image based on the third image information identical to exposure time during which the imaging unit captures the predetermined invisible image projected by the image projecting unit based on the third image information.

7. The mobile electronic device according to claim 5, wherein the visible image and the invisible image projected by the image projecting unit are projected in a superimposed manner.

8. The mobile electronic device according to claim 5, wherein the processing unit causes the image projecting unit to project the invisible image before the image projecting unit projects the visible image.

9. The mobile electronic device according to claim 8, wherein the processing unit causes the image projecting unit to project the visible image when it is determined that the predetermined invisible image is projected.

10. The mobile electronic device according to claim 1, further comprising a notification unit, wherein
the processing unit causes the notification unit to perform notification indicating that the predetermined image is not projected when it is determined that the predetermined image is not projected.

11. The mobile electronic device according to claim 1, further comprising a storage unit, wherein
the processing unit causes the storage unit to store therein information indicating that the predetermined image is not projected when it is determined that the predetermined image is not projected.

* * * * *